(12) United States Patent
Kihn

(10) Patent No.: US 7,020,629 B1
(45) Date of Patent: Mar. 28, 2006

(54) MOMENTUM INVESTMENT SYSTEM, PROCESS AND PRODUCT

(76) Inventor: John Kihn, 1223 Jamie Brooks La., West Windsor, NJ (US) 08550

( * ) Notice: Subject to any disclaimer, the term of this patent is extended or adjusted under 35 U.S.C. 154(b) by 950 days.

(21) Appl. No.: 09/648,522

(22) Filed: Aug. 26, 2000

Related U.S. Application Data

(63) Continuation-in-part of application No. 09/426,956, filed on Oct. 26, 1999, and a continuation-in-part of application No. 09/495,717, filed on Feb. 1, 2000.

(51) Int. Cl.
*G06F 17/60* (2006.01)

(52) U.S. Cl. .............. 705/36; 705/35; 705/37; 705/44

(58) Field of Classification Search .......... 705/35, 705/36, 37, 44
See application file for complete search history.

(56) References Cited

U.S. PATENT DOCUMENTS

| | | | | |
|---|---|---|---|---|
| 5,297,032 A | * | 3/1994 | Trojan et al. ............ | 705/37 |
| 5,978,778 A | * | 11/1999 | O'Shaughnessy ......... | 705/36 |
| 6,078,904 A | * | 6/2000 | Rebane ................... | 705/36 |
| 2002/0174058 A1 | * | 11/2002 | Baghdady ................ | 705/37 |
| 2004/0083158 A1 | * | 4/2004 | Addison et al. ........... | 705/37 |

FOREIGN PATENT DOCUMENTS

CA 2356577 A1 * 3/2002

OTHER PUBLICATIONS

Multi-Talented System Opens windows for Trader's World; Landis, Kenneth M.; Wall Street Computer Review. New York: Apr. 1988.vol. 5, Iss 7; p. 86, 5 pgs.*
A Virtual Stock Market; Volgelstein, Fred; U.S. News & World Report. Washington: Apr. 26, 1999.*

* cited by examiner

*Primary Examiner*—James P. Trammell
*Assistant Examiner*—C Owen Sherr
(74) *Attorney, Agent, or Firm*—Altman & Martin

(57) ABSTRACT

The disclosed mutual fund systems, processes and products involve: selecting, from the universe of asset classes, a restricted number of asset classes that have demonstrated superior returns by maintaining momentum during an existing first period of time, say at least two years; selecting, from these asset classes, portfolios of assets that have demonstrated superior returns by maintaining momentum during an existing second period of time, say at most two years; establishing and optimizing a benchmark based upon these portfolios of assets to identify a moving portfolio having calculated momentum; and tracking and periodically updating investment decisions to monitor and maintain the calculated momentum of the moving portfolio.

12 Claims, 40 Drawing Sheets

| Equity Funds | Total Net Assets (Mil. $) | Rank | Estimated Net Flow (Mil. $) 1 year | Rank | Estimated Net Flow (Mil. $) 01/31/1990 12/31/1999 10 years | Rank |
|---|---|---|---|---|---|---|
| Large-Cap Growth Funds | $507,552 | 1 | $74,290 | 1 | $150,014 | 1 |
| Multi-Cap Growth Funds | $505,773 | 2 | $35,681 | 2 | $113,772 | 2 |
| Science & Technology Funds | $168,385 | 9 | $34,645 | 3 | $46,002 | 10 |
| S&P 500 Funds | $228,509 | 6 | $32,037 | 4 | $107,208 | 4 |
| Large-Cap Core Funds | $362,813 | 3 | $17,798 | 5 | $71,334 | 6 |
| Multi-Cap Core Funds | $172,192 | 8 | $13,726 | 6 | $59,230 | 7 |
| Small-Cap Growth Funds | $79,166 | 14 | $5,193 | 7 | $21,928 | 12 |
| Global Funds | $172,441 | 7 | $4,059 | 8 | $48,396 | 8 |
| Mid-Cap Growth Funds | $121,106 | 12 | $3,865 | 9 | $19,536 | 14 |
| Japanese Funds | $8,467 | 32 | $3,035 | 10 | $4,322 | 29 |
| Telecommunication Funds | $12,455 | 28 | $2,610 | 11 | $3,413 | 31 |
| Pacific Region Funds | $8,591 | 31 | $1,993 | 12 | $4,930 | 27 |
| Large-Cap Value Funds | $349,444 | 4 | $1,779 | 13 | $107,304 | 3 |
| Health/Biotechnology Funds | $39,650 | 18 | $1,346 | 14 | $8,065 | 20 |
| International Small-Cap Funds | $14,999 | 27 | $995 | 15 | $4,918 | 28 |
| International Funds | $258,999 | 5 | $775 | 16 | $93,631 | 5 |
| Balanced Funds | $168,166 | 10 | $591 | 17 | $48,360 | 9 |
| Specialty Diversified Equity Funds | $1,905 | 38 | $331 | 18 | $943 | 35 |
| Canadian Funds | $83 | 42 | ($12) | 19 | ($28) | 39 |
| Pacific Ex Japan Funds | $5,703 | 34 | ($16) | 20 | $2,984 | 32 |
| China Region Funds | $876 | 40 | ($84) | 21 | ($58) | 40 |
| Gold Oriented Funds | $1,805 | 39 | ($96) | 22 | $824 | 36 |
| Sector/Miscellaneous Funds | $3,126 | 36 | ($100) | 23 | $1,004 | 34 |
| Balanced Target Maturity Funds | $860 | 41 | ($171) | 24 | ($615) | 41 |
| Latin American Funds | $2,145 | 37 | ($306) | 25 | $1,472 | 33 |
| Natural Resources Funds | $4,379 | 35 | ($321) | 26 | $599 | 37 |
| Emerging Markets Funds | $23,226 | 25 | ($413) | 27 | $16,345 | 17 |
| Convertible Securities Funds | $8,807 | 30 | ($1,008) | 28 | $444 | 38 |
| Utility Funds | $25,740 | 24 | ($1,215) | 29 | ($4,623) | 42 |
| Real Estate Funds | $7,521 | 33 | ($1,242) | 30 | $6,150 | 23 |
| Small-Cap Core Funds | $37,572 | 20 | ($1,854) | 31 | $11,681 | 18 |
| Mid-Cap Core Funds | $52,320 | 16 | ($1,974) | 32 | $8,984 | 19 |
| European Region Funds | $26,820 | 22 | ($2,479) | 33 | $6,308 | 22 |

Fig. 2.1

| | | | | | | |
|---|---|---|---|---|---|---|
| Global Small-Cap Funds | $26,634 | 23 | ($3,041) | 34 | $3,639 | 30 |
| Mid-Cap Value Funds | $32,018 | 21 | ($3,480) | 35 | $5,470 | 25 |
| Flexible Portfolio Funds | $66,668 | 15 | ($3,720) | 36 | $18,459 | 15 |
| Global Flexible Port Funds | $22,766 | 26 | ($5,178) | 37 | $5,721 | 24 |
| Income Funds | $39,864 | 17 | ($5,427) | 38 | $6,484 | 21 |
| Financial Services Funds | $11,167 | 29 | ($5,713) | 39 | $5,050 | 26 |
| Small-Cap Value Funds | $39,029 | 19 | ($8,795) | 40 | $17,245 | 16 |
| Equity Income Funds | $98,870 | 13 | ($14,610) | 41 | $22,922 | 11 |
| Multi-Cap Value Funds | $163,174 | 11 | ($33,600) | 42 | $19,915 | 13 |
| | | | | | | |
| Total | $3,881,782 | | $139,899 | | $1,069,681 | |

Fig. 2.2

| Fixed Income Funds | Total Assets (Mil. $) | Rank | Net Flow (Mil. $) 1 year | Estimated Rank | Net Flow (Mil. $) 01/31/1990 12/31/1999 10 years | Estimated Rank |
|---|---|---|---|---|---|---|
| Insti Money Market Funds | $370,160 | 2 | $91,691 | 1 | $206,337 | 2 |
| Money Market Funds | $725,465 | 1 | $84,929 | 2 | $341,751 | 1 |
| Intermediate Investment Grade Debt Funds | $77,708 | 8 | $9,555 | 3 | $45,840 | 3 |
| Instl U.S. Government Money Market Funds | $79,651 | 6 | $6,139 | 4 | $22,802 | 9 |
| Tax-Exempt Money Market Funds | $92,327 | 5 | $3,793 | 5 | $25,242 | 7 |
| California Tax-Exempt Money Market Funds | $33,156 | 14 | $3,589 | 6 | $16,501 | 10 |
| Intermediate U.S. Government Funds | $28,135 | 16 | $2,792 | 7 | $10,313 | 12 |
| U.S. Treasury Money Market Funds | $57,724 | 10 | $2,356 | 8 | $23,492 | 8 |
| U.S. Government Money Market Funds | $77,963 | 7 | $2,319 | 9 | $29,424 | 6 |

Fig. 3.1

| | | | | | | |
|---|---|---|---|---|---|---|
| New York Tax-Exempt Money Market Funds | $18,178 | 23 | $1,454 | 10 | $8,417 | 15 |
| Short Investment Grade Debt Funds | $22,619 | 21 | $1,232 | 11 | $3,803 | 20 |
| Massachusetts Tax-Exempt Money Market Fd | $5,090 | 39 | $693 | 12 | $3,005 | 23 |
| Sh-Intmdt U.S. Government Funds | $11,322 | 27 | $599 | 13 | $304 | 51 |
| Target Maturity Funds | $2,004 | 64 | $553 | 14 | $845 | 40 |
| Short U.S. Government Funds | $9,071 | 30 | $529 | 15 | ($413) | 79 |
| Other States Tax-Exempt Money Market Fds | $5,842 | 35 | $497 | 16 | $6,228 | 17 |
| California Intermdt Municipal Debt Funds | $3,494 | 51 | $345 | 17 | $2,227 | 26 |
| Intermediate Municipal Debt Funds | $27,336 | 18 | $336 | 18 | $9,112 | 13 |
| New Jersey Tax-Exempt Money Market Funds | $5,573 | 36 | $261 | 19 | $1,666 | 31 |
| Short Municipal Debt Funds | $7,425 | 32 | $176 | 20 | $2,469 | 25 |
| Ohio Tax-Exempt Money Market Funds | $3,629 | 50 | $86 | 21 | $1,801 | 30 |
| Massachusetts Intermediate Muni Debt Fds | $517 | 84 | $75 | 22 | $264 | 54 |
| Hawaii Municipal Debt Funds | $1,354 | 72 | $74 | 23 | $176 | 59 |
| Other States Sh-Intmdt Muni Debt Fds | $1,498 | 69 | $68 | 24 | $1,147 | 36 |
| Pennsylvania Tax-Exempt Money Market Fds | $4,587 | 42 | $25 | 25 | $2,136 | 27 |
| Georgia Municipal Debt Funds | $951 | 76 | $13 | 26 | $301 | 52 |
| New York Insured Municipal Debt Funds | $2,218 | 60 | $8 | 27 | $567 | 46 |
| Florida Insured Municipal Debt Funds | $1,198 | 73 | $1 | 28 | $953 | 37 |
| Washington Municipal Debt Funds | $47 | 89 | ($10) | 29 | ($4) | 68 |
| Tennessee Municipal Debt Funds | $765 | 78 | ($11) | 30 | $352 | 48 |
| South Carolina Municipal Debt Funds | $716 | 79 | ($12) | 31 | $63 | 66 |

Fig. 3.2

| | | | | | | |
|---|---|---|---|---|---|---|
| Louisiana Municipal Debt Funds | $434 | 86 | ($12) | 32 | $69 | 65 |
| Virginia Municipal Debt Funds | $2,426 | 57 | ($14) | 33 | $886 | 38 |
| Kansas Municipal Debt Funds | $401 | 87 | ($16) | 34 | $295 | 53 |
| Virginia Intermediate Muni Debt Fds | $594 | 81 | ($23) | 35 | $141 | 62 |
| Ultra-Short Obligations Funds | $6,383 | 33 | ($29) | 36 | $2,812 | 24 |
| Missouri Municipal Debt Funds | $995 | 75 | ($32) | 37 | $237 | 57 |
| Pennsylvania Municipal Debt Funds | $7,502 | 31 | ($32) | 38 | $1,207 | 35 |
| Sh-Intmdt Municipal Debt Funds | $6,102 | 34 | ($34) | 39 | $1,348 | 34 |
| Alabama Municipal Debt Funds | $443 | 85 | ($37) | 40 | ($8) | 69 |
| California Sh-Intmdt Municipal Debt Fds | $568 | 82 | ($38) | 41 | $320 | 50 |
| Florida Intermediate Municipal Debt Fds | $872 | 77 | ($41) | 42 | $246 | 56 |
| Texas Municipal Debt Funds | $344 | 88 | ($48) | 43 | ($141) | 72 |
| Ohio Intermediate Municipal Debt Fds | $655 | 80 | ($49) | 44 | $249 | 55 |
| Connecticut Tax-Exempt Money Market Fds | $2,878 | 54 | ($54) | 45 | $846 | 39 |
| Colorado Municipal Debt Funds | $1,131 | 74 | ($63) | 46 | $145 | 61 |
| Maryland Municipal Debt Funds | $2,348 | 59 | ($66) | 47 | $207 | 58 |
| Kentucky Municipal Debt Funds | $1,395 | 71 | ($73) | 48 | $130 | 64 |
| General Bond Funds | $4,800 | 41 | ($77) | 49 | $3,133 | 22 |
| North Carolina Municipal Debt Funds | $2,074 | 62 | ($87) | 50 | $320 | 49 |
| Pennsylvania Intermediate Muni Debt Fds | $526 | 83 | ($88) | 51 | ($212) | 77 |
| Massachusetts Municipal Debt Funds | $4,185 | 43 | ($94) | 52 | ($376) | 78 |
| Oregon Municipal Debt Funds | $1,455 | 70 | ($94) | 53 | $4 | 67 |
| Other States Municipal Debt Funds | $1,793 | 65 | ($95) | 54 | $501 | 47 |
| California Insured Municipal Debt Funds | $3,998 | 45 | ($96) | 55 | $578 | 45 |

Fig. 3.3

| | | | | | | |
|---|---|---|---|---|---|---|
| Michigan Tax-Exempt Money Market Funds | $1,551 | 67 | ($120) | 56 | $660 | 42 |
| Arizona Municipal Debt Funds | $2,037 | 63 | ($120) | 57 | ($87) | 71 |
| Connecticut Municipal Debt Funds | $1,719 | 66 | ($140) | 58 | ($175) | 74 |
| Intermediate U.S. Treasury Funds | $3,826 | 47 | ($166) | 59 | $1,803 | 29 |
| International Income Funds | $5,404 | 38 | ($176) | 60 | $1,575 | 32 |
| General U.S. Treasury Funds | $2,738 | 56 | ($181) | 61 | ($39) | 70 |
| Minnesota Municipal Debt Funds | $2,860 | 55 | ($206) | 62 | ($146) | 73 |
| Corporate Debt Funds BBB-Rated | $23,624 | 19 | ($211) | 63 | $8,914 | 14 |
| New Jersey Municipal Debt Funds | $5,017 | 40 | ($212) | 64 | $130 | 63 |
| New York Intermdt Municipal Debt Funds | $2,118 | 61 | ($214) | 65 | $657 | 43 |
| Emerging Markets Debt Funds | $3,672 | 49 | ($230) | 66 | $1,810 | 28 |
| Ohio Municipal Debt Funds | $3,762 | 48 | ($241) | 67 | ($182) | 75 |
| Short World Multi-Market Income Funds | $1,517 | 68 | ($260) | 68 | ($5,965) | 82 |
| Instl Tax-Exempt Money Market Funds | $36,159 | 13 | ($285) | 69 | $8,269 | 16 |
| Michigan Municipal Debt Funds | $3,237 | 52 | ($325) | 70 | ($209) | 76 |
| Sh-Intmdt Investment Grade Debt Funds | $13,504 | 25 | ($356) | 71 | $3,761 | 21 |
| Other States Intermediate Muni Debt Fds | $3,859 | 46 | ($361) | 72 | $1,492 | 33 |
| Florida Municipal Debt Funds | $5,521 | 37 | ($543) | 73 | $583 | 44 |
| Adjustable Rate Mortgage Funds | $3,123 | 53 | ($669) | 74 | ($11,550) | 84 |
| Flexible Income Funds | $2,403 | 58 | ($716) | 75 | $167 | 60 |
| Short U.S. Treasury Funds | $4,041 | 44 | ($840) | 76 | $740 | 41 |
| New York Municipal Debt Funds | $18,465 | 22 | ($1,257) | 77 | ($1,766) | 80 |
| GNMA Funds | $38,231 | 12 | ($1,271) | 78 | ($23,344) | 87 |
| Insured Municipal Debt Funds | $11,700 | 26 | ($1,292) | 79 | ($5,682) | 81 |
| Global Income Funds | $10,397 | 28 | ($1,420) | 80 | ($70,481) | 89 |
| High Yield Municipal Debt Funds | $16,870 | 24 | ($1,514) | 81 | $4,397 | 19 |

Fig. 3.4

| | | | | | | |
|---|---|---|---|---|---|---|
| U.S. Mortgage Funds | $9,943 | 29 | ($1,688) | 82 | ($15,412) | 85 |
| General U.S. Government Fds | $27,415 | 17 | ($2,198) | 83 | ($28,556) | 88 |
| Corporate Debt Funds A-Rated | $38,832 | 11 | ($2,246) | 84 | $6,077 | 18 |
| Instl U.S. Treasury Money Market Funds | $101,156 | 3 | ($2,324) | 85 | $36,363 | 4 |
| Multi-Sector Income Funds | $22,644 | 20 | ($3,071) | 86 | $10,853 | 11 |
| California Municipal Debt Funds | $30,621 | 15 | ($3,139) | 87 | ($7,862) | 83 |
| High Current Yield Funds | $99,746 | 4 | ($4,915) | 88 | $34,996 | 5 |
| General Municipal Debt Funds | $71,567 | 9 | ($7,024) | 89 | ($18,412) | 86 |
| Total | $2,361,299 | | $172,934 | | $713,434 | |

Fig. 3.5

| | Estimated Net Flow (Mil. $) 1yr ending 12/31/1997 | Rank | Estimated Net Flow (Mil. $) 1yr ending 12/31/1998 | Rank | Estimated Net Flow (Mil. $) 1yr ending 12/31/1999 | Rank |
|---|---|---|---|---|---|---|
| Large-Cap Growth Funds | $12,141 | 7 | $32,148 | 1 | $74,290 | 1 |
| Multi-Cap Growth Funds | $5,981 | 12 | ($4,482) | 40 | $35,681 | 2 |
| Science & Technology Funds | $1,386 | 23 | $115 | 21 | $34,645 | 3 |
| S&P 500 Funds | $18,545 | 4 | $25,305 | 3 | $32,037 | 4 |
| Large-Cap Core Funds | $10,334 | 9 | $9,769 | 5 | $17,798 | 5 |
| Multi-Cap Core Funds | $12,020 | 8 | $16,760 | 4 | $13,726 | 6 |
| Small-Cap Growth Funds | $4,304 | 16 | $1,820 | 12 | $5,193 | 7 |
| Global Funds | $12,826 | 6 | $5,537 | 7 | $4,059 | 8 |
| Mid-Cap Growth Funds | $1,706 | 21 | ($4,068) | 39 | $3,865 | 9 |
| Japanese Funds | ($191) | 36 | $281 | 19 | $3,035 | 10 |

Fig. 4.1

| | | | | | | |
|---|---|---|---|---|---|---|
| Telecommunication Funds | ($250) | 37 | $586 | 18 | $2,610 | 11 |
| Pacific Region Funds | ($1,157) | 40 | ($902) | 32 | $1,993 | 12 |
| Large-Cap Value Funds | $26,096 | 1 | $32,099 | 2 | $1,779 | 13 |
| Health/Biotechnology Funds | $988 | 26 | $4,989 | 9 | $1,346 | 14 |
| International Small-Cap Funds | $404 | 28 | $266 | 20 | $995 | 15 |
| International Funds | $19,297 | 3 | ($764) | 31 | $775 | 16 |
| Balanced Funds | $7,554 | 11 | $7,433 | 6 | $591 | 17 |
| Specialty Diversified Equity Funds | ($599) | 39 | ($240) | 27 | $331 | 18 |
| Canadian Funds | ($51) | 34 | ($39) | 23 | ($12) | 19 |
| Pacific Ex Japan Funds | ($2,323) | 41 | ($220) | 26 | ($16) | 20 |
| China Region Funds | $89 | 32 | ($118) | 24 | ($84) | 21 |
| Gold Oriented Funds | $171 | 29 | $87 | 22 | ($96) | 22 |
| Sector/Miscellaneous Funds | ($264) | 38 | $614 | 17 | ($100) | 23 |
| Balanced Target Maturity Funds | ($179) | 35 | ($152) | 25 | ($171) | 24 |
| Latin American Funds | $415 | 27 | ($1,412) | 37 | ($306) | 25 |
| Natural Resources Funds | $91 | 31 | ($1,360) | 36 | ($321) | 26 |
| Emerging Markets Funds | $4,769 | 15 | ($1,074) | 33 | ($413) | 27 |
| Convertible Securities Funds | $140 | 30 | ($395) | 29 | ($1,008) | 28 |
| Utility Funds | ($2,840) | 42 | ($323) | 28 | ($1,215) | 29 |
| Real Estate Funds | $4,282 | 17 | ($1,280) | 34 | ($1,242) | 30 |
| Small-Cap Core Funds | $4,857 | 14 | $4,093 | 10 | ($1,854) | 31 |
| Mid-Cap Core Funds | $2,181 | 18 | ($726) | 30 | ($1,974) | 32 |
| European Region Funds | $1,182 | 25 | $5,385 | 8 | ($2,479) | 33 |
| Global Small-Cap Funds | $1,812 | 20 | ($2,487) | 38 | ($3,041) | 34 |
| Mid-Cap Value Funds | $1,286 | 24 | ($1,318) | 35 | ($3,480) | 35 |
| Flexible Portfolio Funds | $2,043 | 19 | $2,503 | 11 | ($3,720) | 36 |
| Global Flexible Port Funds | $1,624 | 22 | ($5,128) | 41 | ($5,178) | 37 |
| Income Funds | $36 | 33 | $1,555 | 15 | ($5,427) | 38 |
| Financial Services Funds | $5,586 | 13 | $1,738 | 14 | ($5,713) | 39 |
| Small-Cap Value Funds | $13,951 | 5 | $1,754 | 13 | ($8,795) | 40 |
| Equity Income Funds | $8,330 | 10 | $1,145 | 16 | ($14,610) | 41 |
| Multi-Cap Value Funds | $19,878 | 2 | ($7,431) | 42 | ($33,600) | 42 |
| Total | $198,450 | | $122,066 | | $139,899 | |

Fig. 4.2

| | A | B | C | D | E | F | G | H | I |
|---|---|---|---|---|---|---|---|---|---|
| 1 | | | | | | | | | |
| 2 | | Fund Name | L Cls | L Cls Description | Latest TNA Date | Latest Total Net Assets (Mil. $) | Pro IOB | Pro IOB Description | Load Type |
| 3 | | | | | | | | | |
| 4 | | | | | | | | | |
| 5 | | | | | | | | | |
| 6 | Large-Cap Growth Funds | | | | | | | | |
| 7 | | ABN AMRO:Growth;Com | LCGE | Large-Cap Growth Funds | 03/31/2000 | 218.5 | G | Growth Funds | No Load |
| 8 | | ABN AMRO:Growth;Inv | LCGE | Large-Cap Growth Funds | 03/31/2000 | 3.7 | G | Growth Funds | Front-End Load |
| 9 | | Accessor:Growth;Adv | LCGE | Large-Cap Growth Funds | 03/31/2000 | 365.0 | G | Growth Funds | No Load |
| 10 | | Accessor:Growth;Inv | LCGE | Large-Cap Growth Funds | 03/31/2000 | 51.3 | G | Growth Funds | Level Load |
| 11 | | Advance Cap I:Cornerstne | LCGE | Large-Cap Growth Funds | 03/31/2000 | 67.2 | G | Growth Funds | No Load |
| 12 | | Advantus Horizon;A | LCGE | Large-Cap Growth Funds | 03/31/2000 | 72.1 | G | Growth Funds | Front-End Load |
| 13 | | Advantus Horizon;B | LCGE | Large-Cap Growth Funds | 03/31/2000 | 29.9 | G | Growth Funds | Back-End Load |
| 14 | | Advantus Horizon;C | LCGE | Large-Cap Growth Funds | 03/31/2000 | 2.8 | G | Growth Funds | Level Load |
| 15 | | Aetna:Growth;A | LCGE | Large-Cap Growth Funds | 03/31/2000 | 98.0 | G | Growth Funds | Front-End Load |
| 16 | | Aetna:Growth;B | LCGE | Large-Cap Growth Funds | 03/31/2000 | 5.0 | G | Growth Funds | Back-End Load |
| 17 | | Aetna:Growth;C | LCGE | Large-Cap Growth Funds | 03/31/2000 | 3.0 | G | Growth Funds | Level Load |
| 18 | | Aetna:Growth;I | LCGE | Large-Cap Growth Funds | 03/31/2000 | 269.0 | G | Growth Funds | Institutional Load |
| 19 | | AIM Eq:Blue Chip;Rtl A | LCGE | Large-Cap Growth Funds | 03/31/2000 | 2930.5 | GI | Growth & Income Funds | Front-End Load |
| 20 | | AIM Eq:Blue Chip;Rtl B | LCGE | Large-Cap Growth Funds | 03/31/2000 | 2494.2 | GI | Growth & Income Funds | Back-End Load |
| 21 | | AIM Eq:Blue Chip;Rtl C | LCGE | Large-Cap Growth Funds | 03/31/2000 | 559.9 | GI | Growth & Income Funds | Level Load |
| 22 | | AIM Eq:Charter;Rtl A | LCGE | Large-Cap Growth Funds | 03/31/2000 | 6198.2 | GI | Growth & Income Funds | Front-End Load |
| 23 | | AIM Eq:Charter;Rtl B | LCGE | Large-Cap Growth Funds | 03/31/2000 | 3004.3 | GI | Growth & Income Funds | Back-End Load |
| 24 | | AIM Eq:Charter;Rtl C | LCGE | Large-Cap Growth Funds | 03/31/2000 | 284.0 | GI | Growth & Income Funds | Level Load |
| 25 | | AIM Eq:Dent Demogrph;A | LCGE | Large-Cap Growth Funds | 03/31/2000 | 539.8 | G | Growth Funds | Front-End Load |
| 26 | | AIM Eq:Dent Demogrph;B | LCGE | Large-Cap Growth Funds | 03/31/2000 | 580.6 | G | Growth Funds | Back-End Load |
| 27 | | AIM Eq:Dent Demogrph;C | LCGE | Large-Cap Growth Funds | 03/31/2000 | 222.3 | G | Growth Funds | Level Load |
| 28 | | AIM Eq:Large Cap Gro;A | LCGE | Large-Cap Growth Funds | 03/31/2000 | 32.4 | G | Growth Funds | Front-End Load |
| 29 | | AIM Eq:Large Cap Gro;B | LCGE | Large-Cap Growth Funds | 03/31/2000 | 19.5 | G | Growth Funds | Back-End Load |
| 30 | | AIM Eq:Large Cap Gro;C | LCGE | Large-Cap Growth Funds | 03/31/2000 | 8.3 | G | Growth Funds | Level Load |
| 31 | | AIM Eq:Wngarten;Rtl A | LCGE | Large-Cap Growth Funds | 03/31/2000 | 10778.9 | G | Growth Funds | Front-End Load |
| 32 | | AIM Eq:Wngarten;Rtl B | LCGE | Large-Cap Growth Funds | 03/31/2000 | 1963.6 | G | Growth Funds | Back-End Load |
| 33 | | AIM Eq:Wngarten;Rtl C | LCGE | Large-Cap Growth Funds | 03/31/2000 | 237.5 | G | Growth Funds | Level Load |

Fig. 5.1

| | Load Type | Latest Total Expense Ratio | Turnover Portfolio | NASDAQ Symbol | Mgt Co. Code | Management Company Name | 11/30/1989 Cum Tot Return | 12/31/1989 Cum Tot Return | 01/31/1990 Cum Tot Return | 02/28/1990 Cum Tot Return | 03/31/1990 Cum Tot Return |
|---|---|---|---|---|---|---|---|---|---|---|---|
| 8 | No Load | 1.060 | 65 | RGTCX | ABN | ABN AMRO ASSET MGMT INC | N/A | N/A | N/A | N/A | N/A |
| 9 | Front-End Load | 1.520 | 65 | AGISX | ABN | ABN AMRO ASSET MGMT INC | N/A | N/A | N/A | N/A | N/A |
| 10 | No Load | 0.920 | 112 | AGROX | ACS | ACCESSOR CAPITAL MGMT LP | N/A | N/A | N/A | N/A | N/A |
| 11 | Level Load | N/A | N/A | AGRIX | ACS | ACCESSOR CAPITAL MGMT LP | N/A | N/A | N/A | N/A | N/A |
| 12 | No Load | N/A | N/A | ADCRX | ADV | ADVANCE CAPITAL MGMT INC | 2.06 | N/A | N/A | N/A | N/A |
| 13 | Front-End Load | 1.300 | 60 | ADIOX | ADS | ADVANTUS CAPITAL MGMT | N/A | -8.27 | 1.89 | N/A | 4.18 |
| 14 | Back-End Load | 2.040 | 60 | ADHBX | ADS | ADVANTUS CAPITAL MGMT | N/A | N/A | N/A | N/A | N/A |
| 15 | Level Load | 2.040 | 60 | | ADS | ADVANTUS CAPITAL MGMT | N/A | N/A | N/A | N/A | N/A |
| 16 | Front-End Load | 1.190 | 142 | AEGAX | AET | AETNA LIFE INS & ANNTY | N/A | N/A | N/A | N/A | N/A |
| 17 | Back-End Load | 1.940 | 142 | | AET | AETNA LIFE INS & ANNTY | N/A | N/A | N/A | N/A | N/A |
| 18 | Level Load | 1.940 | 142 | | AET | AETNA LIFE INS & ANNTY | N/A | N/A | N/A | N/A | N/A |
| 19 | Institutional Load | 0.940 | 142 | AEGRX | AET | AETNA LIFE INS & ANNTY | 4.24 | -6.27 | 1.05 | N/A | 2.53 |
| 20 | Front-End Load | 1.190 | 22 | ABCAX | AIM | AIM ADVISORS INC | N/A | N/A | N/A | N/A | N/A |
| 21 | Back-End Load | 1.910 | 22 | ABCBX | AIM | AIM ADVISORS INC | N/A | N/A | N/A | N/A | N/A |
| 22 | Level Load | 1.900 | 22 | ABCCX | AIM | AIM ADVISORS INC | N/A | N/A | N/A | N/A | N/A |
| 23 | Front-End Load | 1.050 | 107 | CHTRX | AIM | AIM ADVISORS INC | 0.90 | -6.14 | 1.47 | N/A | 2.26 |
| 24 | Back-End Load | 1.800 | 107 | BCHTX | AIM | AIM ADVISORS INC | N/A | N/A | N/A | N/A | N/A |
| 25 | Level Load | 1.800 | 107 | CHTCX | AIM | AIM ADVISORS INC | N/A | N/A | N/A | N/A | N/A |
| 26 | Front-End Load | N/A | N/A | ADDAX | AIM | AIM ADVISORS INC | N/A | N/A | N/A | N/A | N/A |
| 27 | Back-End Load | N/A | N/A | ADDBX | AIM | AIM ADVISORS INC | N/A | N/A | N/A | N/A | N/A |
| 28 | Level Load | N/A | N/A | ADDCX | AIM | AIM ADVISORS INC | N/A | N/A | N/A | N/A | N/A |
| 29 | Front-End Load | 1.530 | 21 | LCGAX | AIM | AIM ADVISORS INC | N/A | N/A | N/A | N/A | N/A |
| 30 | Back-End Load | 2.230 | 21 | | AIM | AIM ADVISORS INC | N/A | N/A | N/A | N/A | N/A |
| 31 | Level Load | 2.230 | 21 | LCGBX | AIM | AIM ADVISORS INC | N/A | N/A | N/A | N/A | N/A |
| 32 | Front-End Load | 1.030 | 124 | WEINX | AIM | AIM ADVISORS INC | 0.26 | -8.14 | 2.22 | N/A | 5.06 |
| 33 | Back-End Load | 1.820 | 124 | BWEIX | AIM | AIM ADVISORS INC | N/A | N/A | N/A | N/A | N/A |
| 34 | Level Load | 1.820 | 124 | CWEIX | AIM | AIM ADVISORS INC | N/A | N/A | N/A | N/A | N/A |

| | A | B | C | D | E | F | G | H | I |
|---|---|---|---|---|---|---|---|---|---|
| 522 | | UAM:Sirach Eqty;Inst | LCGE | Large-Cap Growth Funds | 03/31/2000 | 54.2 | G | Growth Funds | Institutional Load |
| 523 | | UAM:Sirach Growth;Inst | LCGE | Large-Cap Growth Funds | 03/31/2000 | 72.2 | G | Growth Funds | Institutional Load |
| 524 | | UAM:Sirach Growth;Int Sv | LCGE | Large-Cap Growth Funds | 03/31/2000 | 11.0 | G | Growth Funds | Institutional Load |
| 525 | | UBS Inv US Lg Cap Gro | LCGE | Large-Cap Growth Funds | 03/31/2000 | 7.7 | G | Growth Funds | Level Load |
| 526 | | UMB Scout Stock Select | LCGE | Large-Cap Growth Funds | 03/31/2000 | 7.9 | G | Growth Funds | No Load |
| 527 | | Unified:Starwood Strat | LCGE | Large-Cap Growth Funds | 03/31/2000 | 3.4 | G | Growth Funds | No Load |
| 528 | | United Vanguard Fund;A | LCGE | Large-Cap Growth Funds | 03/31/2000 | 3013.2 | G | Growth Funds | Front-End Load |
| 529 | | United Vanguard Fund;Y | LCGE | Large-Cap Growth Funds | 03/31/2000 | 19.6 | G | Growth Funds | Institutional Load |
| 530 | | Universal Capital Growth | LCGE | Large-Cap Growth Funds | 02/29/2000 | 18.3 | CA | Capital Appreciation Funds | Front-End Load |
| 531 | | USAA First Srt Growth | LCGE | Large-Cap Growth Funds | 03/31/2000 | 235.3 | G | Growth Funds | No Load |
| 532 | | Value Line Fund | LCGE | Large-Cap Growth Funds | 03/31/2000 | 503.3 | GI | Growth & Income Funds | No Load |
| 533 | | Value Line Lvge Growth | LCGE | Large-Cap Growth Funds | 03/31/2000 | 785.7 | CA | Capital Appreciation Funds | No Load |
| 534 | | Value Line Multinatl Co | LCGE | Large-Cap Growth Funds | 03/31/2000 | 45.1 | GI | Growth & Income Funds | No Load |
| 535 | | Van Kampen Eq Gro;A | LCGE | Large-Cap Growth Funds | 03/31/2000 | 37.1 | G | Growth Funds | Front-End Load |
| 536 | | Van Kampen Eq Gro;B | LCGE | Large-Cap Growth Funds | 03/31/2000 | 44.1 | G | Growth Funds | Back-End Load |
| 537 | | Van Kampen Eq Gro;C | LCGE | Large-Cap Growth Funds | 03/31/2000 | 15.7 | G | Growth Funds | Level Load |
| 538 | | Vanguard Growth Indx;Ins | LCGE | Large-Cap Growth Funds | 03/31/2000 | 633.2 | G | Growth Funds | Institutional Load |
| 539 | | Vanguard Growth Indx;Inv | LCGE | Large-Cap Growth Funds | 03/31/2000 | 16387.4 | G | Growth Funds | No Load |
| 540 | | Vanguard US Growth | LCGE | Large-Cap Growth Funds | 03/31/2000 | 20039.9 | G | Growth Funds | No Load |
| 541 | | WellsFargo:Lg Co Gr;A | LCGE | Large-Cap Growth Funds | 03/31/2000 | 292.6 | G | Growth Funds | Front-End Load |
| 542 | | WellsFargo:Lg Co Gr;B | LCGE | Large-Cap Growth Funds | 03/31/2000 | 378.3 | G | Growth Funds | Back-End Load |
| 543 | | WellsFargo:Lg Co Gr;I | LCGE | Large-Cap Growth Funds | 03/31/2000 | 1366.2 | G | Growth Funds | Institutional Load |
| 544 | | White Oak Growth Stock | LCGE | Large-Cap Growth Funds | 03/31/2000 | 3701.8 | G | Growth Funds | No Load |
| 545 | | Wilshire Tgt:LC Gr;Inst | LCGE | Large-Cap Growth Funds | 03/31/2000 | 121.7 | G | Growth Funds | Institutional Load |
| 546 | | Wilshire Tgt:LC Gr;Inv | LCGE | Large-Cap Growth Funds | 03/31/2000 | 609.8 | G | Growth Funds | No Load |
| 547 | | WM:Growth;A | LCGE | Large-Cap Growth Funds | 03/31/2000 | 414.7 | G | Growth Funds | Front-End Load |
| 548 | | WM:Growth;B | LCGE | Large-Cap Growth Funds | 03/31/2000 | 516.3 | G | Growth Funds | Back-End Load |
| 549 | | WM:Growth;I | LCGE | Large-Cap Growth Funds | 03/31/2000 | 477.1 | G | Growth Funds | Institutional Load |
| 550 | | Wp Stewart Growth Fund | LCGE | Large-Cap Growth Funds | 03/31/2000 | 76.3 | G | Growth Funds | No Load |
| 551 | | WT:Wilm Lg Cap Gro;Instl | LCGE | Large-Cap Growth Funds | 03/31/2000 | 320.0 | G | Growth Funds | No Load |
| 552 | | Average/Total | | | | 583102.9 | | | |
| 553 | | Median | | | | 76.3 | | | |

Fig. 5.4

| | J | K | L | M | N | O | P | Q | R |
|---|---|---|---|---|---|---|---|---|---|
| 522 Institutional Load | 0.900 | 121 | SIEQX | UAM | UAM FUND SERVICES INC | N/A | N/A | N/A | N/A |
| 523 Institutional Load | 1.010 | 90 | SGRWX | UAM | UAM FUND SERVICES INC | N/A | N/A | N/A | N/A |
| 524 Institutional Load | 1.240 | 90 | SGWSX | UAM | UAM FUND SERVICES INC | N/A | N/A | N/A | N/A |
| 525 Level Load | 1.570 | 51 | | UBS | UBS A.G./UBS BRINSON | N/A | N/A | N/A | N/A |
| 526 No Load | N/A | N/A | | UMB | UMB BANK N.A. | N/A | N/A | N/A | N/A |
| 527 No Load | 1.500 | 120 | STRWX | VIN | UNIFIED INV ADVISERS INC | N/A | N/A | N/A | N/A |
| 528 Front-End Load | 1.130 | 84 | UNVGX | WNR | WADDELL & REED INV MGMT CO | 0.72 | -5.99 | 3.10 | 3.35 |
| 529 Institutional Load | 0.900 | 84 | | WNR | WADDELL & REED INV MGMT CO | N/A | N/A | N/A | N/A |
| 530 Front-End Load | 2.000 | 71 | UCGFX | GBG | GRAVER BOKHOF GOODWIN & SULLIVAN LP | N/A | N/A | N/A | N/A |
| 531 No Load | 1.650 | 27 | UFSGX | USA | USAA INVESTMENT MGMT CO | N/A | N/A | N/A | N/A |
| 532 No Load | 0.770 | 98 | VLIFX | VAL | VALUE LINE INC | 0.32 | -7.97 | 1.73 | 4.26 |
| 533 No Load | 0.870 | 54 | VALLX | VAL | VALUE LINE INC | 0.83 | -8.58 | 1.56 | 3.64 |
| 534 No Load | 1.560 | 36 | VLUMX | VAL | VALUE LINE INC | N/A | N/A | N/A | N/A |
| 535 Front-End Load | 1.500 | 126 | VEGAX | VNK | VAN KAMPEN INV ADV CORP | N/A | N/A | N/A | N/A |
| 536 Back-End Load | 2.250 | 126 | VEGBX | VNK | VAN KAMPEN INV ADV CORP | N/A | N/A | N/A | N/A |
| 537 Level Load | 2.250 | 126 | VEGCX | VNK | VAN KAMPEN INV ADV CORP | N/A | N/A | N/A | N/A |
| 538 Institutional Load | 0.120 | 29 | VIGIX | VAN | VANGUARD GROUP INC | N/A | N/A | N/A | N/A |
| 539 No Load | 0.220 | 29 | VIGRX | VAN | VANGUARD GROUP INC | 1.09 | -5.97 | 2.29 | 4.58 |
| 540 No Load | 0.390 | 49 | VWUSX | VAN | VANGUARD GROUP INC | N/A | N/A | N/A | N/A |
| 541 Front-End Load | 1.200 | 28 | NVLAX | WFB | WELLS FARGO BANK | N/A | N/A | N/A | N/A |
| 542 Back-End Load | 1.760 | 28 | NVLOX | WFB | WELLS FARGO BANK | N/A | N/A | N/A | N/A |
| 543 Institutional Load | 1.000 | 28 | NVLCX | WFB | WELLS FARGO BANK | N/A | N/A | N/A | N/A |
| 544 No Load | 1.000 | 6 | WOGSX | OAK | OAK ASSOCIATES | N/A | N/A | N/A | N/A |
| 545 Institutional Load | 0.620 | 57 | WLCGX | WLS | WILSHIRE ASSOCIATES INC | N/A | N/A | N/A | N/A |
| 546 No Load | 0.730 | 57 | DTLGX | WLS | WILSHIRE ASSOCIATES INC | N/A | N/A | N/A | N/A |
| 547 Front-End Load | 1.272 | 119 | SRGFX | WMS | WASHINGTON MUTUAL INC | N/A | N/A | N/A | N/A |
| 548 Back-End Load | 2.032 | 119 | SQGRX | WMS | WASHINGTON MUTUAL INC | N/A | N/A | N/A | N/A |
| 549 Institutional Load | 0.872 | 119 | | WMS | WASHINGTON MUTUAL INC | N/A | N/A | N/A | N/A |
| 550 No Load | 1.900 | 32 | WPSGX | WPS | STEWART W.P. & CO INC | 1.12 | -7.84 | 3.27 | 3.67 |
| 551 No Load | 0.800 | 52 | RMGPX | WIL | WILMINGTON TRUST/RODNEY SQUARE | N/A | N/A | N/A | N/A |
| 552 | 1.445 | 94 | | | | 0.91 | -7.29 | 1.78 | 3.29 |
| 553 | 1.350 | 78 | | | | 0.85 | -7.38 | 1.89 | 3.25 |

| | A | B | C | D | E | F | G | H | I | J |
|---|---|---|---|---|---|---|---|---|---|---|
| 1 | 1st toss out all without TR data before 1/31/95 | | | | | | | | | |
| 2 | 2nd eliminate duplicate funds by same MF company and for same mandate (order of preference: lowest total expenses (1st no load, 2nd institutional load, 3rd front-end lo | | | | | | | | | |
| 8 | | | | | Latest | | Pro | | | |
| 9 | Fund | L | L Cls | Latest | Total Net | Pro | IOB | Load | Latest Total | Turnover NAC |
| 10 | Name | Cls | Description | TNA Date | Assets (Mil. $) | IOB | Description | Type | Expense Ratio | Portfolio Sym |
| 12 | WT:Wilm Lg Cap Gro;Instl | LCGE | Large-Cap Growth Funds | 03/31/2000 | 320.0 | G | Growth Funds | No Load | 0.8 | 52 RM( |
| 13 | Wp Stewart Growth Fund | LCGE | Large-Cap Growth Funds | 03/31/2000 | 76.3 | G | Growth Funds | No Load | 1.9 | 32 WP |
| 14 | WM:Growth;A | LCGE | Large-Cap Growth Funds | 03/31/2000 | 414.7 | G | Growth Funds | Front-End Load | 1.272 | 119 SRC |
| 15 | Wilshire Tgt:LC Gr;Inv | LCGE | Large-Cap Growth Funds | 03/31/2000 | 609.8 | G | Growth Funds | No Load | 0.73 | 57 DTL |
| 16 | White Oak Growth Stock | LCGE | Large-Cap Growth Funds | 03/31/2000 | 3701.8 | G | Growth Funds | No Load | 1 | 6 WO |
| 17 | WellsFargo:Lg Co Gr;I | LCGE | Large-Cap Growth Funds | 03/31/2000 | 1366.2 | G | Growth Funds | Institutional Load | 1 | 28 NVL |
| 18 | Vanguard US Growth | LCGE | Large-Cap Growth Funds | 03/31/2000 | 20038.9 | G | Growth Funds | No Load | 0.39 | 49 VW |
| 19 | Vanguard Growth Indx;Inv | LCGE | Large-Cap Growth Funds | 03/31/2000 | 16387.4 | G | Growth Funds | No Load | 0.22 | 29 VIG |
| 20 | Value Line Lrge Growth | LCGE | Large-Cap Growth Funds | 03/31/2000 | 785.7 | CA | Capital Appreciatic | No Load | 0.87 | 54 VAL |
| 21 | Value Line Fund | LCGE | Large-Cap Growth Funds | 03/31/2000 | 503.3 | GI | Growth & Income | No Load | 0.77 | 98 VLIF |
| 22 | Universal Capital Growth | LCGE | Large-Cap Growth Funds | 02/29/2000 | 18.3 | CA | Capital Appreciatic | Front-End Load | 2 | 71 UCC |
| 23 | United Vanguard Fund;A | LCGE | Large-Cap Growth Funds | 03/31/2000 | 3013.2 | G | Growth Funds | Front-End Load | 1.13 | 84 UN\ |
| 24 | UAM:Sirach Growth;Inst | LCGE | Large-Cap Growth Funds | 03/31/2000 | 72.2 | G | Growth Funds | Institutional Load | 1.01 | 90 SGF |
| 25 | Turner Gro Equity | LCGE | Large-Cap Growth Funds | 03/31/2000 | 309.2 | CA | Capital Appreciatic | No Load | 1.04 | 250 TRG |
| 26 | Trainer Worthm:First Mut | LCGE | Large-Cap Growth Funds | 03/31/2000 | 74.9 | CA | Capital Appreciatic | No Load | 1.64 | 56 FMF |
| 27 | TCW Galileo:Sel Eq;Instl | LCGE | Large-Cap Growth Funds | 03/31/2000 | 447.2 | G | Growth Funds | Institutional Load | 0.88 | 48 TGC |
| 28 | Target:Large Cap Growth | LCGE | Large-Cap Growth Funds | 03/31/2000 | 615.4 | G | Growth Funds | No Load | 0.68 | 54 TAL |
| 29 | SunAmerica:Blue Chp;A | LCGE | Large-Cap Growth Funds | 03/31/2000 | 147.9 | G | Growth Funds | Front-End Load | 1.49 | 71 SVL |
| 30 | Strong Total Return | LCGE | Large-Cap Growth Funds | 03/31/2000 | 1950.6 | GI | Growth & Income | No Load | 1 | 268 STR |
| 31 | Stein Roe Growth Stock | LCGE | Large-Cap Growth Funds | 03/31/2000 | 1158.3 | G | Growth Funds | No Load | 0.94 | 36 SRF |
| 32 | SS Research:Growth;S | LCGE | Large-Cap Growth Funds | 03/31/2000 | 235.4 | G | Growth Funds | Institutional Load | 0.72 | 39 STS |
| 33 | Spectra Fund | LCGE | Large-Cap Growth Funds | 03/31/2000 | 1098.3 | CA | Capital Appreciatic | No Load | 1.96 | 191 SPE |
| 34 | Sit Large Cap Growth | LCGE | Large-Cap Growth Funds | 03/31/2000 | 178.2 | GI | Growth & Income | No Load | 1 | 71 SNI |

Fig. 6.1

| Expense Ratio | Turnover | NASDAQ Symbol | Mgt Co. Code | Management Company Name | 12/31/1994 01/31/1995 Cum Tot Return | 01/31/1995 02/28/1995 Cum Tot Return | 02/28/1995 03/31/1995 Cum Tot Return | 03/31/1995 04/30/1995 Cum Tot Return | 04/30/1995 05/31/1995 Cum Tot Return | 05/31/1995 06/30/1995 Cum Tot Return |
|---|---|---|---|---|---|---|---|---|---|---|
| 0.8 | 52 | RMGPX | WIL | WILMINGTON TRUST/RODNEY SQUARE | 0.40% | 3.88% | 2.22% | 1.92% | 0.61% | 6.10% |
| 1.9 | 32 | WPSGX | WPS | STEWART W.P. & CO INC | 2.99% | 2.43% | 2.16% | 2.61% | 3.11% | 3.53% |
| 1.272 | 119 | SRGFX | WMS | WASHINGTON MUTUAL INC | 1.11% | 3.12% | 2.04% | 3.44% | 3.79% | 5.74% |
| 0.73 | 57 | DTLGX | WLS | WILSHIRE ASSOCIATES INC | 2.81% | 3.40% | 2.86% | 2.15% | 3.81% | 3.93% |
| 1 | 6 | WOGSX | OAK | OAK ASSOCIATES | 1.96% | 3.59% | 2.95% | 4.23% | 5.04% | 7.52% |
| 1 | 28 | NVLCX | WFB | WELLS FARGO BANK | 2.05% | 2.50% | 2.97% | 2.62% | 3.11% | 7.24% |
| 0.39 | 49 | VWUSX | VAN | VANGUARD GROUP INC | 2.80% | 3.81% | 2.38% | 3.70% | 3.51% | 2.95% |
| 0.22 | 29 | VIGRX | VAN | VANGUARD GROUP INC | 2.53% | 3.60% | 3.11% | 2.67% | 3.56% | 3.77% |
| 0.67 | 54 | VALLX | VAL | VALUE LINE INC | 0.43% | 5.54% | 2.32% | 2.47% | 2.95% | 6.75% |
| 0.77 | 98 | VLIFX | VAL | VALUE LINE INC | 0.28% | 4.51% | 3.92% | 1.67% | 1.51% | 3.73% |
| 2 | 71 | UCGFX | GBG | GRAVER BOKHOF GOODWIN & SULLIVAN LP | -1.34% | 7.28% | 1.97% | 3.33% | 2.55% | 9.13% |
| 1.13 | 84 | UNVGX | WNR | WADDELL & REED INV MGMT CO | -0.85% | 1.86% | 1.82% | 2.75% | 2.01% | 8.02% |
| 1.01 | 90 | SGRWX | UAM | UAM FUND SERVICES INC | 1.07% | 3.82% | 2.04% | 2.11% | 1.87% | 4.54% |
| 1.04 | 250 | TRGEX | TUR | TURNER INV PARTNERS INC | -0.34% | 3.79% | 1.50% | 1.76% | 2.36% | 3.59% |
| 1.64 | 56 | FMFDX | TWC | TRAINER WORTHAM & CO INC | 0.12% | 2.68% | 4.90% | 3.23% | -0.22% | 8.32% |
| 0.88 | 48 | TGCEX | TCW | TCW FUNDS MANAGEMENT INC | -2.01% | 4.48% | 2.59% | 4.36% | 2.92% | 5.84% |
| 0.68 | 54 | TALGX | PRU | PRUDENTIAL INV FUND MGMT LLC | 1.75% | 2.42% | 2.96% | 2.30% | 3.09% | 3.27% |
| 1.49 | 71 | SVLAX | SAM | SUNAMERICA ASSET MGMT CORP | -0.14% | 3.91% | 3.69% | -0.20% | 2.96% | 2.48% |
| 1 | 268 | STRFX | SCC | STRONG CAPITAL MGMT | -0.08% | 3.69% | 2.92% | 2.43% | 1.55% | 2.66% |
| 0.94 | 36 | SRFSX | SRF | STEIN ROE & FARNHAM INC | 1.08% | 3.32% | 2.69% | 2.71% | 2.06% | 4.03% |
| 0.72 | 39 | STSGX | SSR | STATE STREET RESEARCH & MGMT CO | 2.54% | 3.99% | 2.78% | 3.35% | 3.12% | 6.89% |
| 1.96 | 191 | SPECX | ALG | ALGER FRED MANAGEMENT INC | -0.96% | 5.12% | 3.32% | 7.51% | 3.11% | 13.25% |
| 1 | 71 | SNIGX | SIT | SIT INVESTMENT ASSOCIATES INC | 0.95% | 3.66% | 2.22% | 1.61% | 2.45% | 5.90% |

Fig. 6.2

| | BL | BM | BN | BO | BP | BQ | BR | BS | BT | BU | BV | BW | BX |
|---|---|---|---|---|---|---|---|---|---|---|---|---|---|
| 7 | 02/28/1999 | 03/31/1999 | 04/30/1999 | 05/31/1999 | 06/30/1999 | 07/31/1999 | 08/31/1999 | 09/30/1999 | 10/31/1999 | 11/30/1999 | 12/31/1999 | 01/31/2000 | 02/29/2000 |
| 8 | 03/31/1999 | 04/30/1999 | 05/31/1999 | 06/30/1999 | 07/31/1999 | 08/31/1999 | 09/30/1999 | 10/31/1999 | 11/30/1999 | 12/31/1999 | 01/31/2000 | 02/29/2000 | 03/31/2000 |
| 9 | Cum | Cum | Cum | Cum | Cum | Cum | Cum | Cum | Cum | Cum | Cum | Cum | Cum |
| 10 | Tot Return | Tot Return | Tot Return | Tot Return | Tot Return | Tot Return | Tot Return | Tot Return | Tot Return | Tot Return | Tot Return | Tot Return | Tot Return |
| 12 | 4.00% | -0.37% | -2.75% | 8.74% | -3.49% | 0.60% | -1.20% | 8.22% | 7.37% | 21.69% | -4.91% | 14.14% | 5.80% |
| 13 | 0.95% | -1.27% | -6.10% | 5.95% | -5.44% | 0.20% | -0.84% | 7.08% | -0.60% | 4.67% | -4.63% | -4.96% | 14.63% |
| 14 | 12.15% | 5.09% | -5.61% | 8.01% | -3.93% | 2.77% | 4.89% | 7.41% | 10.94% | 19.74% | 0.17% | 12.27% | 1.75% |
| 15 | 5.11% | -0.06% | -3.22% | 7.01% | -3.19% | 2.54% | -2.42% | 8.00% | 3.00% | 11.62% | -6.83% | 3.47% | 8.21% |
| 16 | 5.53% | -1.72% | -2.50% | 10.80% | -3.64% | 2.44% | -0.80% | 10.51% | 5.31% | 8.93% | 1.00% | 9.14% | 8.98% |
| 17 | 6.21% | 0.44% | -3.50% | 8.83% | -4.86% | 0.25% | -3.79% | 8.63% | 3.68% | 11.00% | -2.54% | 1.88% | 11.80% |
| 18 | 3.59% | -0.80% | -3.34% | 7.37% | -3.62% | 0.78% | -1.96% | 8.65% | 3.28% | 7.08% | -5.56% | 2.14% | 9.03% |
| 19 | 4.82% | -0.21% | -2.95% | 7.28% | -3.15% | 1.33% | -1.69% | 6.90% | 4.28% | 7.79% | -6.67% | 2.07% | 9.21% |
| 20 | 6.46% | -0.62% | -4.70% | 7.85% | -2.60% | 0.06% | -1.35% | 6.29% | 5.10% | 7.95% | -5.86% | 1.83% | 11.03% |
| 21 | 6.51% | -0.20% | -4.15% | 7.53% | -2.23% | -0.92% | -1.33% | 5.03% | 5.18% | 6.32% | -5.79% | 1.86% | 9.09% |
| 22 | 6.59% | 4.93% | -1.58% | 6.16% | -4.99% | -0.34% | -4.19% | 3.92% | 3.38% | 4.46% | -4.03% | 0.67% | 8.88% |
| 23 | 7.25% | -2.29% | -4.48% | 10.44% | -3.28% | 0.10% | 0.70% | 6.23% | 7.09% | 15.25% | -2.76% | 15.62% | 5.13% |
| 24 | 4.42% | -1.97% | -3.17% | 7.06% | -2.98% | -0.14% | -1.65% | 6.48% | 5.13% | 10.38% | -3.93% | 3.07% | 6.41% |
| 25 | 5.97% | -0.64% | -2.51% | 6.08% | -3.18% | 3.16% | -0.87% | 9.57% | 8.29% | 17.72% | -2.03% | 15.07% | 0.46% |
| 26 | 11.16% | 2.60% | -4.83% | 4.95% | -5.38% | 1.85% | 1.94% | 7.69% | 6.23% | 9.58% | -5.17% | 5.13% | 9.35% |
| 27 | 7.49% | -0.32% | -3.60% | 8.85% | -4.44% | 0.63% | -3.25% | 12.26% | 4.88% | 11.39% | -1.42% | 8.18% | 9.22% |
| 28 | 6.65% | -0.04% | -3.57% | 12.14% | -2.23% | 2.19% | -1.53% | 9.69% | 6.37% | 12.26% | 0.58% | 16.49% | 3.99% |
| 29 | 5.51% | 1.94% | -3.60% | 7.03% | -2.71% | 0.55% | -0.92% | 7.37% | 6.07% | 14.46% | -3.70% | 6.39% | 4.55% |
| 30 | 7.89% | 1.91% | -4.36% | 6.83% | -2.18% | -0.05% | -0.67% | 7.20% | 7.08% | 23.89% | -7.15% | 20.54% | -0.97% |
| 31 | 6.33% | -1.67% | -2.68% | 7.41% | -3.19% | -1.28% | -0.99% | 6.17% | 4.57% | 12.91% | 0.18% | 9.93% | 5.13% |
| 32 | 6.52% | 0.95% | -2.30% | 5.03% | -2.24% | 1.88% | -1.43% | 6.54% | 7.21% | 13.62% | -2.33% | 9.90% | 2.84% |
| 33 | 10.82% | 0.14% | -5.77% | 9.51% | -4.49% | 2.19% | 2.35% | 7.49% | 10.87% | 21.11% | -2.75% | 18.44% | -3.10% |
| 34 | 4.26% | -2.15% | -3.16% | 6.96% | -3.41% | 1.06% | -0.16% | 7.79% | 4.41% | 11.96% | -3.58% | 4.27% | 7.91% |

Sheet tabs: rawdata / 1st 2 fund filters / MF selection #1 / MF selection #2 / MF selection #3 / Tracking TR / Possible method to AC selection

| | I | J | K | L | M | N | O | P | Q | R | S |
|---|---|---|---|---|---|---|---|---|---|---|---|
| 102 | 1.09 | 117 | FRGRX | FND | FOUNDERS ASSET MGMT INC | -0.69% | 4.85% | 3.96% | 2.22% | 3.34% | 6.84% |
| 103 | 1.56 | 132 | DEUIX | DEL | DELAWARE MGMT CO INC | 0.10% | 2.16% | 3.22% | -0.97% | 4.72% | 7.05% |
| 104 | 0.76 | 37 | CSGWX | SBS | SSB CITI FUND MANAGEMENT INC | 0.95% | 4.33% | 1.94% | 2.51% | 3.97% | 3.69% |
| 105 | 0.65 | 118 | CLMBX | COL | COLUMBIA FUNDS MGMT CO | 0.24% | 4.86% | 3.60% | 1.40% | 2.26% | 3.78% |
| 106 | 1.05 | 53 | CFLGX | CIT | CITIBANK N.A. | 0.64% | 3.52% | 2.45% | 1.06% | 3.22% | 1.58% |
| 107 | 1 | 35 | RITEX | CMB | CHASE MANHATTAN BANK | 0.98% | 3.17% | 2.65% | 1.12% | 2.46% | 4.60% |
| 108 | 0.68 | 0 | TLGUX | SBS | SSB CITI FUND MANAGEMENT INC | 1.95% | 3.63% | 2.82% | 1.61% | 3.82% | 4.66% |
| 109 | 1.3 | 55 | BURHX | BUR | BURNHAM ASSET MGMT CORP | 1.89% | 2.36% | 1.15% | 2.25% | 2.74% | 1.71% |
| 110 | 1.5 | 58 | BRSRX | BRG | BRIDGEWAY CAPITAL MGMT | 1.72% | 4.37% | 4.28% | 1.46% | 0.99% | 3.29% |
| 111 | 0.89 | 50 | SEGWX | FBB | BANKBOSTON N.A. | 1.43% | 4.52% | 2.36% | 2.82% | 4.29% | 3.54% |
| 112 | 0.81 | 60 | PNAPX | BLK | BLACKROCK INC | 0.60% | 4.37% | 3.90% | 2.01% | 2.51% | 4.19% |
| 113 | 1.35 | 173 | BEOOX | BER | BERGER ASSOCIATES INC | -2.15% | 2.67% | 1.86% | 3.42% | 2.39% | 2.94% |
| 114 | 0.86 | 34 | INNDX | IDS | IDS MUTUAL FUND GROUP | 0.53% | 3.67% | 3.03% | 3.08% | 2.86% | 4.69% |
| 115 | 0.89 | 17 | INIDX | IDS | IDS MUTUAL FUND GROUP | 0.00% | 4.58% | 4.15% | 2.43% | 1.57% | 7.60% |
| 116 | 1.06 | 106 | ASGIX | ATL | ATLAS ADVISERS INC | -0.52% | 4.16% | 4.46% | 1.51% | 1.28% | 4.33% |
| 117 | 0.92 | 57 | AEQIX | NCC | NATIONAL CITY BANK | 2.03% | 2.43% | 1.65% | 1.89% | 2.93% | 2.98% |
| 118 | 1.02 | 74 | OCAAX | OVB | ONE VALLEY BANK N.A. | -1.62% | 4.49% | 2.00% | 2.68% | 4.01% | 6.43% |
| 119 | 1.08 | 71 | GDGAX | CTZ | CITIZENS COMMERCIAL & SAVINGS | 0.54% | 1.87% | 2.29% | 1.29% | 2.52% | 4.13% |
| 120 | | 42 | TWCUX | ACI | AMERICAN CENTURY INV INC | -2.96% | 4.44% | 3.21% | 2.83% | 2.00% | 9.82% |
| 121 | 1 | 92 | TWCGX | ACI | AMERICAN CENTURY INV INC | -1.76% | 3.42% | 4.31% | 3.78% | 3.15% | 4.70% |
| 122 | 1.5 | 75 | APGAX | ALL | ALLIANCE CAPITAL MGMT LP | 2.73% | 3.11% | 3.82% | 4.10% | 5.67% | 7.61% |
| 123 | 1.05 | 32 | MCGFX | CTT | CHICAGO TRUST COMPANY | 2.35% | 2.60% | 3.54% | 3.48% | 3.62% | 5.95% |
| 124 | 1.06 | 29 | CHTIX | CTT | CHICAGO TRUST COMPANY | 1.68% | 3.79% | 1.57% | 2.78% | 2.88% | 3.70% |
| 125 | 1.11 | 130 | ALGRX | ALG | ALGER FRED MANAGEMENT INC | -1.67% | 5.08% | 2.85% | 5.07% | 3.42% | 9.81% |
| 126 | 1.44 | 177 | ALARX | ALG | ALGER FRED MANAGEMENT INC | -3.17% | 8.87% | 6.79% | 6.18% | 4.11% | 14.21% |
| 127 | 1.03 | 124 | WEINX | AIM | AIM ADVISORS INC | -0.72% | 5.10% | 4.10% | 2.60% | 3.19% | 6.23% |
| 128 | 1.05 | 107 | CHTRX | AIM | AIM ADVISORS INC | 1.11% | 3.65% | 4.23% | 2.94% | 3.51% | 4.25% |
| 129 | 1.19 | 22 | ABCAX | AIM | AIM ADVISORS INC | 2.70% | 2.89% | 3.21% | 3.21% | 2.26% | 2.76% |
| 130 | 0.94 | 142 | AEGRX | AET | AETNA LIFE INS & ANNTY | 0.10% | 2.96% | 4.17% | 2.40% | 3.13% | 5.90% |
| 131 | 1.3 | 60 | ADIOX | ADS | ADVANTUS CAPITAL MGMT | 1.49% | 3.52% | 2.04% | 0.72% | 2.10% | 4.48% |
| 132 | 0.92 | 112 | AGROX | ACS | ACCESSOR CAPITAL MGMT LP | 2.30% | 3.61% | 2.98% | 3.77% | 4.31% | 3.05% |
| 133 | 1.06 | 65 | RGTCX | ABN | ABN AMRO ASSET MGMT INC | 0.87% | 4.85% | 2.39% | 2.52% | 3.59% | 4.14% |
| 134 | | | | | | | | | | | |
| 135 | | | | | | 0.70% | 3.63% | 2.94% | 2.31% | 3.12% | 5.14% |

Fig. 6.5

| | N | O | P | Q | R | S | T |
|---|---|---|---|---|---|---|---|
| 105 | 0.0024 | 0.0486 | 0.036 | 0.014 | 0.0226 | 0.0378 | 0.0395 |
| 106 | 0.0064 | 0.0352 | 0.0245 | 0.0106 | 0.0322 | 0.0158 | 0.0316 |
| 107 | 0.0098 | 0.0317 | 0.0265 | 0.0112 | 0.0246 | 0.046 | 0.0454 |
| 108 | 0.0195 | 0.0363 | 0.0282 | 0.0161 | 0.0392 | 0.0466 | 0.0403 |
| 109 | 0.0188 | 0.0236 | 0.0115 | 0.0225 | 0.0274 | 0.0171 | 0.0169 |
| 110 | 0.0172 | 0.0437 | 0.0428 | 0.0146 | 0.0099 | 0.0329 | 0.0439 |
| 111 | 0.0143 | 0.0452 | 0.0236 | 0.0282 | 0.0429 | 0.0354 | 0.0693 |
| 112 | 0.006 | 0.0437 | 0.039 | 0.0201 | 0.0261 | 0.0419 | 0.0448 |
| 113 | -0.0215 | 0.0267 | 0.0186 | 0.0342 | 0.0239 | 0.0294 | 0.0379 |
| 114 | 0.0053 | 0.0367 | 0.0303 | 0.0308 | 0.0286 | 0.0469 | 0.048 |
| 115 | 0 | 0.0458 | 0.0415 | 0.0243 | 0.0157 | 0.076 | 0.0623 |
| 116 | -0.0052 | 0.0416 | 0.0446 | 0.0151 | 0.0128 | 0.0433 | 0.0601 |
| 117 | 0.0203 | 0.0243 | 0.0165 | 0.0189 | 0.0293 | 0.0298 | 0.0418 |
| 118 | -0.0162 | 0.0449 | 0.02 | 0.0268 | 0.0401 | 0.0643 | 0.0735 |
| 119 | 0.0054 | 0.0187 | 0.0229 | 0.0128 | 0.0252 | 0.0413 | 0.0367 |
| 120 | -0.0296 | 0.0444 | 0.0321 | 0.0293 | 0.02 | 0.0982 | 0.1057 |
| 121 | -0.0176 | 0.0342 | 0.0431 | 0.0378 | 0.0315 | 0.047 | 0.0508 |
| 122 | 0.0273 | 0.0311 | 0.0382 | 0.041 | 0.0567 | 0.0761 | 0.0556 |
| 123 | 0.0235 | 0.026 | 0.0354 | 0.0348 | 0.0382 | 0.0695 | 0.0439 |
| 124 | 0.0168 | 0.0379 | 0.0157 | 0.0278 | 0.0288 | 0.037 | 0.0287 |
| 125 | -0.0167 | 0.0508 | 0.0295 | 0.0507 | 0.0342 | 0.0981 | 0.0925 |
| 126 | -0.0317 | 0.0087 | 0.0679 | 0.0618 | 0.0411 | 0.1421 | 0.1362 |
| 127 | -0.0072 | 0.051 | 0.041 | 0.026 | 0.0319 | 0.0623 | 0.0727 |
| 128 | 0.0111 | 0.0365 | 0.0423 | 0.0294 | 0.0351 | 0.0425 | 0.049 |
| 129 | 0.027 | 0.0289 | 0.0321 | 0.0321 | 0.0226 | 0.0276 | 0.0287 |
| 130 | 0.001 | 0.0296 | 0.0417 | 0.024 | 0.0313 | 0.069 | 0.0621 |
| 131 | 0.0149 | 0.0352 | 0.0204 | 0.0072 | 0.021 | 0.0446 | 0.0651 |
| 132 | 0.023 | 0.0361 | 0.0298 | 0.0377 | 0.0431 | 0.0305 | 0.0334 |
| 133 | 0.0087 | 0.0495 | 0.0239 | 0.0252 | 0.0359 | 0.0414 | 0.0605 |
| 134 | | | | | | | |
| 135 | =AVERAGE(N12:N133) | =AVERAGE(O12:O133) | =AVERAGE(P12:P133) | =AVERAGE(Q12:Q133) | =AVERAGE(R12:R133) | =AVERAGE(S12:S133) | =AVERAGE(T12:T13: |

Fig. 6.6

| | A | B | C | D | E | F | G | H | I | J | K | L | M | N | O |
|---|---|---|---|---|---|---|---|---|---|---|---|---|---|---|---|
| 1 | This worksheet is for calculating total returns net of the risk-free rate | | | | | | | | | | | | | | |
| 2 | | | | | | | | | | | | | | | |
| 3 | | 1 month | LCGE | LCGE | | | | WT:Wilm | Wp Stewa | WM:Growt | Wilshire T | White Oak | WellsFarg | Vanguard I | Vanguard |
| 4 | | T-Bill | Large-Cap | Large-Cap Growth Funds | | | | LCGE | LCGE | LCGE | LCGE | LCGE | LCGE | LCGE | Lt |
| 5 | | | minus | | | | | Large-Cap | Large-Cap | Large-Cap | Large-Cap | Large-Cap | Large-Cap | Large-Cap | Large-Cap |
| 6 | risk-free | Average | risk-free | | | | | | | | | | | | |
| 7 | rate | | Equal Wtd rate | | | | | | | | | | | | |
| 8 | | | | | | | | | | | | | | | |
| 17 | | | | | | | | 1 | 2 | 3 | 4 | 5 | 6 | 7 | 8 |
| 18 | 01/31/1995 | 0.47% | 0.70% | 0.23% | | | | 0.40% | 2.99% | 1.11% | 2.81% | 1.96% | 2.05% | 2.80% | 2.53% |
| 19 | 02/28/1995 | 0.48% | 3.63% | 3.15% | | | | 3.88% | 2.43% | 3.12% | 3.40% | 3.59% | 2.50% | 3.81% | 3.80% |
| 20 | 03/31/1995 | 0.48% | 2.94% | 2.46% | | | | 2.22% | 2.16% | 2.04% | 2.86% | 2.95% | 2.97% | 2.38% | 3.11% |
| 21 | 04/30/1995 | 0.48% | 2.31% | 1.83% | | | | 1.92% | 2.61% | 3.44% | 2.15% | 4.23% | 2.62% | 3.70% | 2.67% |
| 22 | 05/31/1995 | 0.47% | 3.12% | 2.64% | | | | 0.61% | 3.11% | 3.79% | 3.81% | 5.04% | 3.11% | 3.51% | 3.56% |
| 23 | 06/30/1995 | 0.48% | 5.14% | 4.67% | | | | 6.10% | 3.53% | 5.74% | 3.93% | 7.52% | 7.24% | 2.95% | 3.77% |
| 24 | 07/31/1995 | 0.46% | 5.22% | 4.76% | | | | 7.18% | 1.68% | 6.49% | 2.90% | 7.06% | 4.90% | 2.11% | 3.24% |
| 25 | 08/31/1995 | 0.46% | 0.50% | 0.05% | | | | 1.28% | -1.84% | 0.73% | 0.12% | 2.05% | 0.91% | -0.37% | -0.31% |
| 26 | 09/30/1995 | 0.45% | 3.34% | 2.89% | | | | 2.62% | 4.12% | 2.96% | 5.57% | 4.91% | 4.24% | 5.63% | 4.88% |
| 27 | 10/31/1995 | 0.44% | -0.85% | -1.28% | | | | -3.94% | 2.69% | -2.68% | 0.52% | 5.06% | -3.08% | 2.36% | 0.83% |
| 28 | 11/30/1995 | 0.44% | 3.06% | 2.62% | | | | 3.67% | 4.34% | 4.46% | 3.75% | 1.99% | 2.03% | 3.93% | 3.59% |
| 29 | 12/31/1995 | 0.44% | -0.40% | -0.85% | | | | -0.19% | -2.87% | 0.48% | -0.04% | -2.86% | -3.09% | 0.30% | 1.16% |
| 30 | 01/31/1996 | 0.43% | 2.47% | 2.04% | | | | -0.57% | 4.18% | 2.34% | 3.72% | 3.41% | 2.64% | 4.03% | 3.79% |
| 31 | 02/29/1996 | 0.42% | 2.39% | 1.97% | | | | 4.56% | 0.69% | 4.85% | 1.55% | 3.67% | 4.68% | 3.07% | 0.90% |
| 32 | 03/31/1996 | 0.41% | 0.26% | -0.15% | | | | 2.60% | 0.36% | 0.73% | 0.27% | -2.69% | 1.13% | -0.32% | -0.42% |
| 33 | 04/30/1996 | 0.41% | 3.22% | 2.81% | | | | 5.65% | 4.29% | 5.38% | 2.44% | 5.36% | 4.10% | 1.84% | 1.87% |
| 34 | 05/31/1996 | 0.42% | 2.96% | 2.55% | | | | 3.06% | 4.65% | 1.99% | 4.39% | 4.48% | 3.18% | 2.93% | 3.60% | rawdata / 1st 2 fund filters / MF selection #1 / MF selection #2 / MF selection #3 / Tracking TR / Possible method to AC selection

| | IE | IF | IG | IH | II | IJ | IK | IL | IM | IN | IO | IP | IQ | IR | IS |
|---|---|---|---|---|---|---|---|---|---|---|---|---|---|---|---|
| 1 | | | | | | | | | | | | | | | |
| 2 | | | | | | | | | | | | | | | |
| 3 | | Amer Cent | Amer Cent | Alliance Pr | Allg/Mont8 | Allg/Chica | Alger Ret | Alger Ret | AIM Eq:W | AIM Eq:Ct | AIM Eq:Bl | Aetna:Gro | Advantus I | Accessor: | ABN AMRO:Growth;Com |
| 4 | | LCGE | LCGE | LCGE | LCGE | LCGE | LCGE | LCGE | LCGE | LCGE | LCGE | LCGE | LCGE | LCGE | LCGE |
| 5 | | Large-Cap | Large-Cap | Large-Cap | Large-Cap | Large-Cap | Large-Cap | Large-Cap | Large-Cap | Large-Cap | Large-Cap | Large-Cap | Large-Cap | Large-Cap | Large-Cap Growth Funds |
| 6 | | minus | minus | minus | minus | minus | minus | minus | minus | minus | minus | minus | minus | minus | minus |
| 7 | | risk-free | risk-free | risk-free | risk-free | risk-free | risk-free | risk-free | risk-free | risk-free | risk-free | risk-free | risk-free | risk-free | risk-free |
| 8 | | rate | rate | rate | rate | rate | rate | rate | rate | rate | rate | rate | rate | rate | rate |
| 9 | | | | | | | | | | | | | | | |
| 10 | | | | | | | | | | | | | | | |
| 11 | | | | | | | | | | | | | | | |
| 12 | | | | | | | | | | | | | | | |
| 13 | | | | | | | | | | | | | | | |
| 14 | | | | | | | | | | | | | | | |
| 15 | | | | | | | | | | | | | | | |
| 16 | | | | | | | | | | | | | | | |
| 17 | | | | | | | | | | | | | | | |
| 18 | -3.43% | -2.23% | 2.26% | 1.09% | 1.21% | -2.14% | -3.64% | -1.19% | 0.64% | 2.23% | -0.37% | 1.02% | 1.83% | 0.40% | |
| 19 | 3.96% | 2.94% | 2.63% | 2.12% | 3.31% | 4.60% | 8.39% | 4.62% | 3.17% | 2.41% | 2.48% | 3.04% | 3.13% | 4.37% | |
| 20 | 2.73% | 3.89% | 3.34% | 3.06% | 1.09% | 2.37% | 6.31% | 3.62% | 3.75% | 2.73% | 3.69% | 1.56% | 2.50% | 1.91% | |
| 21 | 2.35% | 3.30% | 3.62% | 3.00% | 2.30% | 4.59% | 5.70% | 2.12% | 2.46% | 1.92% | 1.92% | 0.24% | 3.29% | 2.04% | |
| 22 | 1.53% | 2.68% | 5.20% | 3.35% | 2.41% | 2.95% | 3.64% | 2.72% | 3.04% | 1.79% | 2.66% | 1.63% | 3.84% | 3.12% | |
| 23 | 9.35% | 4.23% | 7.14% | 5.48% | 3.23% | 9.34% | 13.74% | 5.76% | 3.79% | 2.29% | 5.43% | 4.01% | 2.59% | 3.67% | |
| 24 | 10.11% | 4.62% | 5.10% | 3.93% | 2.41% | 8.79% | 13.36% | 6.81% | 4.44% | 2.41% | 5.75% | 6.05% | 2.68% | 5.59% | |
| 25 | 0.03% | 1.46% | 0.50% | -2.36% | 0.28% | 1.18% | 1.01% | 0.14% | 0.61% | -1.29% | 1.71% | -0.61% | -1.30% | 0.27% | |
| 26 | 3.56% | 2.78% | 4.77% | 2.35% | 4.78% | 2.35% | 2.37% | 3.39% | 4.19% | 4.21% | 0.43% | 1.35% | 3.10% | 2.31% | |
| 27 | 0.46% | -3.41% | -0.31% | 3.10% | -0.28% | -4.08% | -6.15% | -2.79% | -2.20% | -1.24% | -0.51% | -1.97% | 0.92% | -2.65% | |
| 28 | 0.52% | -1.45% | 3.03% | 2.83% | 3.13% | 0.25% | -0.05% | 1.87% | 2.57% | 3.54% | 3.05% | 5.57% | 2.35% | 1.84% | |
| 29 | -3.38% | -5.04% | -3.32% | -0.89% | 1.51% | -1.12% | -3.73% | -1.90% | -0.83% | 0.89% | -1.67% | -1.24% | -0.64% | -0.36% | |
| 30 | 0.11% | 2.66% | 2.42% | 4.16% | 3.42% | 3.26% | 1.35% | 0.87% | 1.58% | 1.31% | 1.28% | 1.53% | 3.45% | 2.19% | |
| 31 | 4.53% | 1.29% | 3.23% | 4.18% | 1.00% | 0.99% | 3.24% | 2.70% | 1.55% | 2.17% | 3.43% | 1.22% | 1.45% | 0.60% | |
| 32 | -4.00% | -2.38% | -1.06% | -1.46% | 0.36% | -1.72% | -2.79% | 0.56% | 0.17% | 1.01% | 0.05% | -0.32% | -0.98% | -0.05% | |
| 33 | 4.37% | 3.05% | 1.76% | 2.26% | 1.75% | 3.06% | 7.69% | 2.10% | 2.03% | 1.47% | 3.13% | 2.24% | 1.92% | 2.61% | |
| 34 | 4.36% | 2.20% | 2.80% | 4.51% | 2.52% | 0.94% | 3.14% | 1.46% | 1.84% | 2.92% | 1.96% | 2.53% | 1.03% | 1.55% | |

Fig. 7.3

| | A | B | C | D | H | I | J | K | L | M | N | O |
|---|---|---|---|---|---|---|---|---|---|---|---|---|
| 50 | 09/30/1997 | 0.43% | 5.42% | 4.99% | 6.37% | 5.20% | 5.68% | 4.97% | 3.05% | 6.97% | 3.60% | 5.08% |
| 51 | 10/31/1997 | 0.41% | -3.68% | -4.09% | -5.51% | -3.18% | -2.78% | -4.66% | -7.92% | -3.77% | -1.91% | -2.99% |
| 52 | 11/30/1997 | 0.41% | 2.20% | 1.78% | 0.86% | 5.94% | -0.44% | 5.68% | 0.92% | 3.07% | 4.51% | 5.41% |
| 53 | 12/31/1997 | 0.43% | 1.11% | 0.68% | 1.89% | 1.99% | -1.07% | 0.71% | -1.06% | 1.72% | 1.48% | 1.20% |
| 54 | 01/31/1998 | 0.43% | 1.48% | 1.05% | -0.89% | 3.73% | 3.10% | 3.09% | 5.69% | 2.63% | 2.89% | 3.37% |
| 55 | 02/28/1998 | 0.42% | 7.83% | 7.41% | 9.35% | 8.89% | 9.36% | 8.61% | 10.57% | 7.93% | 7.82% | 6.91% |
| 56 | 03/31/1998 | 0.43% | 4.58% | 4.16% | 3.15% | 5.07% | 4.81% | 3.69% | 0.38% | 2.58% | 4.11% | 5.14% |
| 57 | 04/30/1998 | 0.42% | 1.59% | 1.17% | 0.92% | -2.47% | 3.76% | 0.38% | 4.61% | 2.61% | 2.38% | 0.84% |
| 58 | 05/31/1998 | 0.42% | -2.65% | -3.07% | -5.02% | -2.58% | -3.05% | -2.41% | -5.05% | -3.22% | -1.53% | -2.01% |
| 59 | 06/30/1998 | 0.42% | 6.25% | 5.83% | 5.02% | 7.56% | 9.42% | 7.21% | 7.56% | 9.11% | 6.40% | 7.13% |
| 60 | 07/31/1998 | 0.42% | -0.70% | -1.11% | -2.29% | -0.36% | -0.43% | -0.60% | 0.27% | 0.21% | -0.59% | -0.04% |
| 61 | 08/31/1998 | 0.41% | -16.46% | -16.87% | -16.85% | -14.70% | -17.09% | -13.55% | -23.50% | -16.69% | -14.12% | -13.04% |
| 62 | 09/30/1998 | 0.41% | 7.50% | 7.09% | 7.83% | 8.96% | 12.07% | 7.17% | 5.52% | 9.40% | 6.09% | 6.70% |
| 63 | 10/31/1998 | 0.40% | 6.31% | 5.92% | 7.97% | 3.67% | 3.28% | 8.05% | 14.99% | 7.34% | 7.02% | 8.41% |
| 64 | 11/30/1998 | 0.34% | 6.97% | 6.63% | 5.14% | 7.23% | 6.75% | 7.18% | 9.78% | 9.53% | 7.25% | 6.78% |
| 65 | 12/31/1998 | 0.37% | 10.80% | 10.43% | 10.41% | 6.76% | 18.39% | 8.21% | 8.94% | 11.98% | 8.57% | 7.67% |
| 66 | 01/31/1999 | 0.36% | 6.86% | 6.50% | 3.90% | 5.80% | 13.25% | 6.29% | 14.59% | 8.18% | 5.41% | 6.16% |
| 67 | 02/28/1999 | 0.36% | -4.17% | -4.53% | 4.00% | -0.96% | -3.31% | -3.69% | -5.81% | -4.20% | -4.93% | -3.93% |
| 68 | 03/31/1999 | 0.37% | 6.15% | 5.78% | 4.00% | 0.95% | 12.15% | 5.11% | 5.53% | 6.21% | 3.59% | 4.82% |
| 69 | 04/30/1999 | 0.36% | 0.21% | -0.15% | -0.37% | -1.27% | 5.09% | -0.06% | -1.72% | 0.44% | -0.80% | -0.21% |
| 70 | 05/31/1999 | 0.36% | -3.30% | -3.66% | -2.75% | -6.10% | -5.61% | -3.22% | -2.50% | -3.50% | -3.34% | -2.95% |
| 71 | 06/30/1999 | 0.38% | 7.29% | 6.92% | 8.74% | 5.95% | 8.01% | 7.01% | 10.80% | 8.83% | 7.37% | 7.28% |
| 72 | 07/31/1999 | 0.38% | -3.16% | -3.54% | -3.49% | -5.44% | -3.93% | -3.19% | -3.64% | -4.86% | -3.62% | -3.15% |
| 73 | 08/31/1999 | 0.38% | 0.38% | 0.00% | 0.60% | 0.20% | 2.77% | 2.54% | 2.44% | 0.25% | 0.76% | 1.33% |
| 74 | 09/30/1999 | 0.40% | -0.85% | -1.25% | -1.20% | -0.84% | 4.89% | -2.42% | -0.80% | -3.79% | -1.98% | -1.69% |
| 75 | 10/31/1999 | 0.39% | 7.09% | 6.69% | 8.22% | 7.08% | 7.41% | 8.00% | 10.51% | 8.63% | 8.65% | 6.90% |
| 76 | 11/30/1999 | 0.41% | 5.61% | 5.21% | 7.37% | -0.60% | 10.94% | 3.00% | 5.31% | 3.68% | 3.28% | 4.28% |
| 77 | 12/31/1999 | 0.42% | 11.94% | 11.52% | 21.69% | 4.67% | 19.74% | 11.52% | 8.93% | 11.00% | 7.08% | 7.79% |
| 78 | 01/31/2000 | 0.44% | -3.84% | -4.27% | -4.91% | -4.63% | 0.17% | -6.83% | 1.00% | -2.54% | -5.56% | -6.67% |
| 79 | 02/29/2000 | 0.45% | 6.81% | 6.37% | 14.14% | -4.96% | 12.27% | 3.47% | 9.14% | 1.88% | 2.14% | 2.07% |
| 80 | 03/31/2000 | 0.46% | 5.61% | 5.14% | 5.80% | 14.63% | 1.75% | 8.21% | 8.98% | 11.80% | 9.03% | 9.21% |

Fig. 7.4

| | DS | DT | DU | DV | DW | DX | DY | DZ | EA | EB | EC | ED | EE | EF | EG |
|---|---|---|---|---|---|---|---|---|---|---|---|---|---|---|---|
| 50 | 6.16% | 5.96% | 5.90% | 5.78% | 4.30% | 5.14% | 4.16% | | 5.94% | 4.77% | 5.45% | 4.54% | 2.62% | 6.54% | 3.17% |
| 51 | -4.50% | -4.42% | -3.64% | -5.13% | -4.03% | -3.36% | -2.91% | | -5.92% | -3.59% | -3.19% | -5.07% | -8.33% | -4.18% | -2.32% |
| 52 | 1.85% | 1.72% | 3.68% | 0.35% | 5.38% | 5.40% | 2.07% | | 0.47% | 5.53% | -0.85% | 5.27% | 0.51% | 2.66% | 4.10% |
| 53 | 0.75% | 0.27% | 1.62% | -1.18% | 3.96% | 0.68% | 0.82% | | 1.46% | 1.56% | -1.50% | 0.28% | -1.49% | 1.29% | 1.05% |
| 54 | 0.75% | 0.65% | 1.22% | 1.67% | 0.70% | 3.57% | 1.58% | | -1.32% | 3.30% | 2.67% | 2.66% | 5.26% | 2.20% | 2.46% |
| 55 | 7.63% | 6.21% | 6.87% | 9.11% | 7.41% | 7.25% | 8.67% | | 8.93% | 8.47% | 8.94% | 8.19% | 10.15% | 7.51% | 7.40% |
| 56 | 4.17% | 4.64% | 4.60% | 5.96% | 4.51% | 4.50% | 4.50% | | 2.72% | 4.64% | 4.38% | 3.26% | -0.05% | 2.15% | 3.68% |
| 57 | 1.74% | -0.07% | 1.77% | 3.55% | -0.08% | -0.16% | 0.24% | | 0.50% | -2.89% | 3.34% | -0.04% | 4.19% | 2.19% | 1.96% |
| 58 | -2.05% | -2.70% | -2.31% | -2.86% | -2.20% | -1.16% | -2.32% | | -5.44% | -3.00% | -3.47% | -2.83% | -5.47% | -3.64% | -1.95% |
| 59 | 5.18% | 4.96% | 4.65% | 5.06% | 8.24% | 7.93% | 5.96% | | 4.60% | 7.14% | 9.00% | 6.79% | 7.14% | 8.69% | 5.98% |
| 60 | -0.61% | 0.14% | -0.77% | -0.90% | -0.20% | -0.12% | -1.26% | | -2.71% | -0.78% | -0.85% | -1.02% | -0.15% | -0.21% | -1.01% |
| 61 | -16.88% | -16.35% | -15.15% | -17.31% | -15.10% | -13.67% | -16.67% | | -17.26% | -15.11% | -17.49% | -13.96% | -23.91% | -17.10% | -14.53% |
| 62 | 6.11% | 5.19% | 5.72% | 9.85% | 9.26% | 7.77% | 4.56% | | 7.42% | 8.55% | 11.66% | 6.76% | 5.11% | 8.99% | 5.68% |
| 63 | 5.35% | 8.38% | 8.10% | 3.49% | 5.00% | 7.77% | 6.83% | | 7.58% | 3.28% | 2.89% | 7.66% | 14.60% | 6.95% | 6.63% |
| 64 | 7.41% | 6.53% | 6.99% | 5.54% | 6.62% | 7.31% | 7.51% | | 4.80% | 6.89% | 6.41% | 6.84% | 9.44% | 9.19% | 6.91% |
| 65 | 13.15% | 9.20% | 8.21% | 12.90% | 6.35% | 10.89% | 10.13% | | 10.04% | 6.39% | 18.02% | 7.84% | 8.57% | 11.61% | 8.30% |
| 66 | 6.00% | 5.30% | 3.86% | 6.23% | 3.21% | 7.34% | 1.70% | | 3.54% | 5.44% | 12.89% | 5.93% | 14.23% | 7.82% | 5.05% |
| 67 | -4.90% | -3.76% | -3.55% | -4.66% | -5.71% | -4.19% | -3.45% | | -4.44% | -1.32% | -3.67% | -4.05% | -6.17% | -4.56% | -5.29% |
| 68 | 6.00% | 6.78% | 4.93% | 5.59% | 5.46% | 6.09% | 2.62% | | 3.63% | 0.58% | 11.78% | 4.74% | 5.16% | 5.84% | 3.22% |
| 69 | -0.30% | 1.43% | 1.10% | 0.33% | -0.19% | -1.21% | 1.39% | | -0.73% | -1.63% | 4.73% | -0.42% | -2.08% | 0.08% | -1.16% |
| 70 | -1.70% | -2.69% | -2.95% | -2.43% | -3.70% | -4.14% | -3.09% | | -3.11% | -6.46% | -5.97% | -3.58% | -2.86% | -3.86% | -3.70% |
| 71 | 7.00% | 7.26% | 6.29% | 8.78% | 8.22% | 6.35% | 7.09% | | 8.36% | 5.57% | 7.63% | 6.63% | 10.42% | 8.45% | 6.99% |
| 72 | -2.70% | -3.75% | -2.77% | -1.08% | -3.30% | -3.55% | -5.43% | | -3.87% | -5.82% | -4.31% | -3.57% | -4.02% | -5.24% | -4.00% |
| 73 | -0.63% | -0.06% | -0.79% | -0.27% | -0.10% | -0.10% | -2.01% | | 0.22% | -0.18% | 2.39% | 2.16% | 2.06% | -0.13% | 0.40% |
| 74 | 0.78% | -1.28% | -0.98% | -2.23% | 1.19% | -1.81% | -2.66% | | -1.60% | -1.24% | 4.49% | -2.82% | -1.20% | -4.19% | -2.38% |
| 75 | 4.50% | 5.93% | 7.02% | 4.74% | 5.28% | 7.29% | 8.31% | | 7.83% | 6.69% | 7.02% | 7.61% | 10.12% | 8.24% | 8.26% |
| 76 | 6.85% | 4.20% | 3.23% | 4.26% | 4.35% | 3.24% | 2.12% | | 6.96% | -1.01% | 10.53% | 2.59% | 4.90% | 3.27% | 2.87% |
| 77 | 10.65% | 11.50% | 8.63% | 12.62% | 10.26% | 9.29% | 6.65% | | 21.27% | 4.25% | 19.32% | 11.20% | 8.51% | 10.58% | 6.66% |
| 78 | -3.62% | -3.68% | -3.30% | -4.45% | -5.10% | -6.81% | -5.79% | | -5.35% | -5.07% | -0.27% | -7.27% | 0.56% | -2.98% | -6.00% |
| 79 | 15.33% | 3.37% | 1.57% | 7.42% | 7.81% | 2.69% | 4.63% | | 13.70% | -5.41% | 11.83% | 3.03% | 8.70% | 1.44% | 1.70% |
| 80 | 2.27% | 8.75% | 8.85% | 7.41% | 6.01% | 8.01% | 8.96% | | 5.34% | 14.17% | 1.29% | 7.75% | 8.52% | 11.34% | 8.57% |

| | IH | II | IJ | IK | IL | IM | IN | IO | IP |
|---|---|---|---|---|---|---|---|---|---|
| | -0.49% | -1.06% | -0.11% | 0.04% | 0.48% | 0.24% | -0.26% | 0.34% | 0.14% |
| 50 | -0.42% | -0.90% | -0.09% | 0.04% | 0.46% | 0.10% | -0.24% | 0.23% | 0.22% |
| 51 | -0.36% | -0.82% | -0.08% | 0.02% | 0.48% | 0.01% | -0.22% | 0.36% | 0.24% |
| 52 | -0.41% | -0.81% | -0.04% | -0.02% | 0.43% | -0.05% | -0.08% | 0.34% | 0.22% |
| 53 | -0.46% | -0.78% | -0.03% | -0.04% | 0.44% | -0.01% | -0.08% | 0.37% | 0.21% |
| 54 | -0.43% | -0.90% | -0.06% | -0.05% | 0.43% | -0.04% | -0.07% | 0.39% | 0.30% |
| 55 | -0.33% | -0.81% | -0.10% | -0.06% | 0.39% | -0.01% | -0.07% | 0.45% | 0.32% |
| 56 | -0.35% | -0.69% | -0.07% | -0.09% | 0.44% | 0.07% | -0.12% | 0.40% | 0.26% |
| 57 | -0.18% | -0.75% | -0.01% | -0.10% | 0.42% | 0.08% | -0.09% | 0.51% | 0.27% |
| 58 | -0.06% | -0.47% | 0.01% | -0.16% | 0.32% | 0.09% | -0.08% | 0.51% | 0.25% |
| 59 | 0.31% | -0.20% | 0.00% | -0.14% | 0.22% | -0.11% | -0.02% | 0.49% | 0.12% |
| 60 | 0.30% | -0.04% | -0.13% | -0.19% | 0.25% | -0.11% | 0.10% | 0.63% | -0.02% |
| 61 | 0.32% | 0.15% | -0.15% | -0.24% | 0.19% | 0.04% | 0.13% | 0.66% | -0.10% |
| 62 | 0.31% | 0.15% | -0.17% | -0.16% | 0.21% | -0.12% | 0.16% | 0.65% | -0.19% |
| 63 | 0.33% | 0.31% | -0.14% | -0.17% | 0.21% | -0.16% | 0.10% | 0.64% | -0.14% |
| 64 | 0.41% | 0.42% | -0.09% | -0.27% | 0.17% | -0.17% | 0.12% | 0.71% | -0.14% |
| 65 | 0.40% | 0.50% | -0.09% | -0.30% | 0.10% | -0.22% | 0.07% | 0.70% | -0.28% |
| 66 | 0.55% | 0.98% | -0.18% | -0.37% | 0.00% | -0.22% | -0.14% | 0.55% | -0.30% |
| 67 | 0.48% | 1.00% | -0.17% | -0.28% | 0.02% | -0.22% | -0.02% | 0.56% | -0.50% |
| 68 | 0.50% | 1.21% | -0.14% | -0.21% | 0.01% | -0.18% | -0.12% | 0.41% | -0.43% |
| 69 | 0.44% | 1.19% | -0.07% | -0.22% | 0.01% | -0.11% | -0.15% | 0.36% | -0.43% |
| 70 | 0.46% | 1.11% | -0.09% | -0.21% | -0.03% | -0.07% | -0.13% | 0.30% | -0.36% |
| 71 | 0.43% | 1.04% | -0.06% | -0.24% | -0.05% | 0.01% | -0.09% | 0.30% | -0.46% |
| 72 | 0.26% | 1.16% | -0.17% | -0.25% | -0.04% | -0.09% | 0.04% | 0.38% | -0.57% |
| 73 | 0.29% | 1.30% | -0.12% | -0.30% | -0.09% | -0.16% | 0.03% | 0.33% | -0.62% |
| 74 | 0.31% | 1.35% | -0.15% | -0.28% | -0.05% | -0.17% | 0.02% | 0.35% | -0.61% |
| 75 | 0.36% | 1.59% | -0.09% | -0.30% | -0.18% | -0.15% | -0.15% | 0.14% | -0.73% |
| 76 | 0.37% | 1.79% | -0.10% | -0.27% | -0.24% | -0.04% | -0.30% | 0.14% | -0.81% |
| 77 | 0.44% | 1.90% | -0.06% | -0.24% | -0.24% | -0.07% | -0.30% | 0.13% | -0.95% |
| 78 | 0.37% | 2.25% | 0.22% | -0.30% | -0.38% | -0.09% | -0.36% | -0.16% | -1.04% |
| 79 | 0.42% | 2.09% | 0.12% | -0.19% | -0.26% | -0.08% | -0.32% | -0.27% | -0.92% |
| 80 | | | | | | | | -0.18% | |

| | N | O | P | Q | R | S | T | U | V | W | X | Y | Z | AA | AB | AC |
|---|---|---|---|---|---|---|---|---|---|---|---|---|---|---|---|---|
| 3 | Rank 03/31/1998 | Rank 06/30/1998 | | Rank 09/30/1998 | | Rank 12/31/1998 | | Rank 03/31/1999 | | Rank 06/30/1999 | | Rank 09/30/1999 | | Rank 12/31/1999 | Rank |
| 5 | 0.06% | 32 | -0.12% | 59 | -0.30% | 80 | -0.34% | 100 | -0.32% | 105 | -0.46% | 103 | -0.65% | 111 | -0.32% | 115 | 94 |
| 6 | 0.74% | 6 | 0.38% | 3 | 0.23% | 22 | 0.09% | 31 | 0.12% | 52 | -0.19% | 48 | -0.17% | 87 | -0.67% | 68 | 112 |
| 7 | -0.72% | 115 | -0.44% | 118 | -0.35% | 106 | -0.15% | 105 | 0.50% | 89 | 0.83% | 16 | 1.26% | 5 | 1.69% | 5 | 4 |
| 8 | 0.43% | 19 | 0.30% | 16 | 0.48% | 30 | 0.48% | 14 | 0.33% | 11 | 0.20% | 24 | 0.31% | 31 | 0.25% | 24 | 29 |
| 9 | -0.01% | 79 | -0.06% | 66 | -0.42% | 72 | -0.42% | 108 | -0.31% | 107 | -0.21% | 102 | -0.12% | 90 | 0.09% | 81 | 42 |
| 10 | 0.10% | 29 | 0.16% | 56 | 0.33% | 43 | 0.33% | 20 | 0.54% | 13 | 0.46% | 13 | 0.25% | 14 | 0.09% | 29 | 43 |
| 11 | 0.37% | 21 | 0.34% | 24 | 0.32% | 27 | 0.32% | 21 | 0.12% | 21 | 0.02% | 47 | 0.17% | 56 | -0.07% | 33 | 60 |
| 12 | 0.68% | 8 | 0.60% | 4 | 0.77% | 5 | 0.75% | 5 | 0.54% | 3 | 0.36% | 15 | 0.46% | 17 | 0.28% | 13 | 25 |
| 13 | -0.34% | 88 | -0.16% | 99 | -0.34% | 85 | -0.18% | 104 | 0.08% | 94 | 0.00% | 56 | -0.09% | 62 | -0.18% | 69 | 78 |
| 14 | -0.18% | 50 | -0.32% | 84 | -0.62% | 100 | -0.63% | 111 | -0.55% | 114 | -0.57% | 114 | -0.62% | 114 | -0.79% | 114 | 117 |
| 15 | -0.39% | 95 | -0.22% | 102 | 0.06% | 87 | -0.13% | 55 | -0.24% | 85 | 0.01% | 92 | -0.24% | 97 | -0.80% | 97 | 118 |
| 16 | -0.53% | 110 | -0.31% | 112 | -0.30% | 97 | -0.15% | 101 | -0.27% | 91 | -0.28% | 97 | -0.10% | 75 | 0.06% | 75 | 49 |
| 17 | 0.44% | 4 | 0.40% | 14 | -0.02% | 20 | -0.05% | 70 | -0.31% | 75 | -0.34% | 101 | -0.42% | 104 | -0.75% | 106 | 115 |
| 18 | -0.03% | 65 | -0.13% | 68 | 0.08% | 81 | 0.15% | 51 | 0.19% | 46 | 0.18% | 37 | 0.14% | 37 | 0.31% | 40 | 22 |
| 19 | -0.03% | 30 | 0.40% | 69 | 0.12% | 109 | -0.13% | 109 | 0.17% | 86 | 0.27% | 39 | 0.41% | 23 | 0.10% | 16 | 39 |
| 20 | -0.34% | 89 | -0.51% | 98 | -0.44% | 94 | -0.01% | 67 | 0.24% | 76 | 0.22% | 29 | 0.14% | 30 | 0.17% | 38 | 33 |
| 21 | -0.39% | 109 | -0.29% | 104 | -0.31% | 95 | -0.31% | 103 | -0.23% | 104 | 0.01% | 90 | 0.06% | 59 | 0.38% | 46 | 18 |
| 22 | -0.20% | 85 | -0.30% | 66 | -0.07% | 74 | -0.04% | 75 | -0.20% | 70 | -0.09% | 86 | -0.09% | 79 | -0.09% | 68 | 64 |
| 23 | -0.30% | 90 | -0.06% | 93 | 0.07% | 77 | 0.03% | 53 | 0.15% | 58 | 0.20% | 46 | 0.21% | 32 | 0.45% | 31 | 16 |
| 24 | 0.14% | 37 | 0.12% | 48 | -0.06% | 49 | -0.06% | 74 | 0.04% | 83 | -0.12% | 64 | -0.06% | 82 | -0.30% | 66 | 91 |
| 25 | -1.19% | 121 | -1.54% | 122 | -1.50% | 122 | -1.10% | 120 | -1.14% | 120 | -0.79% | 121 | -0.70% | 120 | -0.50% | 118 | 105 |
| 26 | -0.27% | 93 | -0.19% | 92 | -0.14% | 86 | 0.08% | 84 | 0.22% | 54 | 0.19% | 31 | 0.33% | 33 | 0.79% | 21 | 11 |
| 27 | 0.41% | 25 | 0.40% | 19 | 0.12% | 21 | 0.06% | 48 | -0.01% | 56 | -0.10% | 70 | -0.10% | 95 | -0.27% | 72 | 69 |
| 28 | -0.19% | 92 | -0.23% | 85 | -0.17% | 89 | -0.12% | 84 | -0.19% | 66 | -0.07% | 74 | 0.09% | 74 | 0.07% | 42 | 47 |
| 29 | 0.31% | 34 | 0.38% | 32 | 0.35% | 17 | 0.27% | 29 | 0.22% | 32 | 0.12% | 40 | 0.03% | 48 | -0.08% | 48 | 63 |
| 30 | 0.05% | 56 | 0.04% | 60 | 0.07% | 52 | 0.21% | 35 | 0.16% | 41 | -0.14% | 86 | -0.01% | 55 | -0.06% | 55 | 59 |
| 31 | 0.01% | 77 | -0.04% | 63 | -0.05% | 72 | 0.17% | 41 | 0.16% | 42 | 0.10% | 43 | 0.08% | 43 | -0.15% | 43 | 70 |
| 32 | 0.35% | 26 | 0.24% | 39 | 0.95% | 2 | 0.74% | 4 | 0.87% | 3 | 1.10% | 2 | 1.45% | 2 | 2.28% | 1 | 1 |
| 33 | -1.02% | 122 | -0.84% | 119 | -0.18% | 90 | 0.02% | 60 | 0.55% | 12 | 0.48% | 13 | 0.67% | 8 | 1.22% | 9 | 7 |
| 34 | 0.50% | 27 | 0.48% | 10 | 0.67% | 8 | 0.67% | 8 | 0.67% | 5 | 0.52% | 12 | 0.67% | 12 | 0.84% | | 9 |

Fig. 9.2

| | AF | AH | AI | AJ | AK | AL | AM | AN | AO | AP | AQ | AR | AS | AT | AU |
|---|---|---|---|---|---|---|---|---|---|---|---|---|---|---|---|
| 3 | | 12/31/1996 | Rank | 03/31/1997 | Rank | 06/30/1997 | Rank | 09/30/1997 | Rank | 12/31/1997 | Rank | 03/31/1998 | Rank | 06/30/1998 | Rank |
| 5 | 2 Wp Stewart Growth Fund | 0.68% | 4 | 0.49% | 10 | 0.55% | 10 | 0.47% | 13 | 0.55% | 6 | 0.74% | 3 | 0.38% | 22 |
| 6 | 3 WM:Growth;A | -0.10% | 75 | -0.28% | 92 | -0.49% | 106 | -0.54% | 110 | -0.69% | 115 | -0.72% | 118 | -0.44% | 106 |
| 7 | 7 Vanguard US Growth | 0.74% | 3 | 0.62% | 3 | 0.62% | 7 | 0.39% | 22 | 0.35% | 21 | 0.37% | 24 | 0.34% | 27 |
| 8 | 8 Vanguard Growth Indx;Inv | 0.59% | 10 | 0.59% | 5 | 0.70% | 2 | 0.55% | 7 | 0.53% | 8 | 0.69% | 4 | 0.60% | 5 |
| 9 | 28 Rydex:OTC Fund;Inv | 0.63% | 6 | 0.47% | 15 | 0.19% | 51 | 0.43% | 17 | 0.11% | 55 | 0.35% | 26 | 0.24% | 38 |
| 10 | 55 MFS Mass Invest Gro;A | -0.39% | 101 | 0.08% | 57 | 0.16% | 54 | 0.34% | 26 | 0.65% | 2 | 0.62% | 2 | 0.69% | 2 |
| 11 | 58 Merrill Growth Fund;A | 0.75% | 2 | 0.75% | 2 | 0.56% | 9 | 0.83% | 2 | 0.56% | 3 | 0.30% | 33 | -0.40% | 105 |
| 12 | 62 Magna:Growth & Income | 0.59% | 12 | 0.59% | 4 | 0.63% | 6 | 0.61% | 4 | 0.37% | 20 | 0.43% | 15 | 0.44% | 15 |
| 13 | 64 Legg Mason Value Tr;Nav | 1.29% | 1 | 1.35% | 1 | 1.28% | 1 | 1.36% | 1 | 1.07% | 1 | 1.09% | 1 | 1.24% | 1 |
| 14 | 67 Janus Twenty | 0.36% | 28 | 0.45% | 16 | 0.38% | 26 | 0.22% | 45 | 0.29% | 28 | 0.27% | 34 | 0.65% | 3 |
| 15 | 68 Janus Mercury | -0.21% | 86 | -0.29% | 93 | -0.49% | 107 | -0.59% | 111 | -0.60% | 112 | -0.61% | 115 | -0.29% | 93 |
| 16 | 115 Alger Ret:Cap Apprec | -0.81% | 116 | -0.54% | 114 | -0.95% | 119 | -1.06% | 120 | -0.81% | 119 | -0.81% | 119 | -0.47% | 108 |

Fig. 9.3

| | AQ | AR | AS | AT | AU | AV | AW | AX | AY | AZ | BA | BB | BC | BD | BE | BF | BG | BH |
|---|---|---|---|---|---|---|---|---|---|---|---|---|---|---|---|---|---|---|
| 3 | | Rank 03/31/1998 | Rank 06/30/1998 | | Rank 09/30/1998 | | Rank 12/31/1998 | | Rank 03/31/1999 | | Rank 06/30/1999 | | Rank 09/30/1999 | | Rank 12/31/1999 | Rank | |
| 4 | | | | | | | | | | | | | | | | | | |
| 5 | 6 | 0.74% | 3 | 0.38% | 22 | 0.23% | 31 | 0.09% | 52 | 0.12% | 48 | -0.19% | 87 | -0.17% | 88 | -0.67% | 112 | |
| 6 | 115 | -0.72% | 118 | -0.44% | 106 | -0.35% | 105 | -0.15% | 89 | 0.50% | 16 | 0.83% | 5 | 1.26% | 5 | 1.69% | 4 | |
| 7 | 21 | 0.37% | 24 | 0.34% | 27 | 0.32% | 21 | 0.34% | 21 | 0.12% | 47 | 0.02% | 56 | 0.17% | 33 | -0.07% | 60 | |
| 8 | 8 | 0.68% | 4 | 0.60% | 5 | 0.77% | 5 | 0.75% | 3 | 0.54% | 15 | 0.36% | 17 | 0.46% | 13 | 0.28% | 25 | |
| 9 | 55 | 0.35% | 26 | 0.24% | 38 | 0.95% | 2 | 0.74% | 4 | 0.87% | 3 | 1.10% | 2 | 1.45% | 1 | 2.28% | 1 | |
| 10 | 2 | 0.82% | 2 | 0.69% | 2 | 0.79% | 4 | 0.88% | 2 | 0.63% | 8 | 0.56% | 9 | 0.40% | 18 | 0.28% | 24 | |
| 11 | 3 | 0.30% | 33 | -0.40% | 105 | -1.20% | 120 | -2.10% | 122 | -2.73% | 122 | -2.39% | 122 | -2.51% | 122 | -2.12% | 122 | |
| 12 | 20 | 0.43% | 15 | 0.44% | 15 | 0.53% | 11 | 0.34% | 22 | 0.05% | 63 | 0.00% | 61 | -0.01% | 54 | -0.08% | 62 | |
| 13 | 1 | 1.09% | 1 | 1.24% | 1 | 0.83% | 3 | 0.67% | 7 | 0.79% | 4 | 0.65% | 6 | 0.16% | 35 | 0.16% | 34 | |
| 14 | 28 | 0.27% | 34 | 0.65% | 3 | 1.06% | 1 | 1.10% | 1 | 1.41% | 1 | 1.04% | 3 | 1.36% | 3 | 1.61% | 5 | |
| 15 | 112 | -0.61% | 115 | -0.28% | 93 | -0.19% | 93 | -0.02% | 68 | 0.63% | 9 | 0.95% | 4 | 1.36% | 2 | 1.78% | 3 | |
| 16 | 119 | -0.81% | 119 | -0.47% | 108 | 0.15% | 40 | 0.42% | 16 | 1.00% | 2 | 1.11% | 1 | 1.30% | 4 | 1.79% | 2 | |

MOMENTUM INVESTMENT SYSTEM, PROCESS AND PRODUCT

RELATED APPLICATIONS

The present application is a continuation-in-part of earlier applications: Ser. No. 09/426,956, filed on Oct. 26, 1999, for Universal Asset Class Benchmark System & Process; and Ser. No. 09/495,717, filed on Feb. 1, 2000, for Real Time Benchmarking Of Investment and Financial Assets. The sole inventor in both of these applications is John Kihn, the sole inventor in the present application.

BACKGROUND OF THE INVENTION

1. Field of the Invention

The present invention relates to the assessment and management of financial assets and, more particularly, to systems, processes and products involving investment vehicles, particularly, mutual funds and the like.

2. The Prior Art

As of the year 2000, the mutual fund industry is one of the fastest growing financial industries in the United States. Investment in mutual funds often is preferred over investment in individual stocks and bonds' because of four critically desirable characteristics: (1) broad diversification; (2) professional management; (3) liquidity; and (4) convenience.

A mutual fund is a financial intermediary, which sells shares to the public and invests the proceeds in financial assets including (1) stocks, (2) bonds and (3) cash financial securities. Obviously, a fund's profit and loss statement reflects interest, dividends and capital gains on one hand, and costs, expenses and capital losses on the other hand. Ordinarily, highly skilled and highly paid management and research services are among a mutual fund's largest expenses.

Obtaining higher rates of return is a preeminent objective of mutual fund management and research. According to "portfolio theory", as developed by economists, every investment may be characterized by two measures—expected return and risk. R. Brealy, An introduction to Risk and Return for Common Stocks (1969). It is axiomatic that risk and expected return are correlated: the higher the risk, the greater the expected return; the lower the risk, the smaller the expected return. J. Lorie and M. Hamilton, The Stock Market: Theories and Evidence (1973).

Efforts to obtain higher rates of return have focused on technical analysis and fundamental analysis. Technical analysis theorizes that buying and selling patterns in financial markets are random occurrences that largely depend on investor psychology, without any predictable connection between future and past stock market data. Fama, Efficient Capital Markets: A Review of Theory and Empirical Work, 25 J. Finance 383 (1970). Fundamental analysis theorizes that stock prices are correlated with corporate earnings, and predictability depends on the availability of information or interpretations of information about relevant data. Cohen, Zinbarg & Zeikel, Investment Analysis and Portfolio Management, 739 (1973). Technical analysts "study past prices" and "buy stock", whereas fundamental analysts "study reports" and "buy companies". Sunny J. Harris, Trading 102: Getting Down To Business (1998). Neither technical analysis nor fundamental analysis, however, has provided a favorable edge in the assessment of future value of financial assets.

Much of both technical analysis and fundamental analysis relies heavily upon the mathematical procedure known as "indexing". Simply stated, indexing merely means collecting and analyzing financial information about a group of financial assets and deriving there from quantitative measures that are thought to be useful in assessing value. Widely known and used daily indices include (1) the Dow Jones Industrial Average, which is calculated from about 30 "Blue Chip" stocks, (2) the Standard & Poors 500 Index, which is calculated from 500 stocks, (3) the AMEX Market Value Index, which tracks the average of stocks traded on the American Stock Exchange, and (4) the NASDAQ Composite Index, which tracks all of the stocks traded on the National Association Of Security Dealers exchange. The problem is that most indices are based upon historical assumptions and/or rules that cannot be guaranteed to apply realistically at any particular time.

As will be described in more detail below, the present invention relies upon measures that are more properly considered to be benchmarks than indices. The terms index and benchmark often are used somewhat interchangeably. However, strictly speaking a benchmark is commonly more of a reference within a localized process, while an index is more commonly viewed as a generally applicable statistical term. Webster's defines benchmark as "a standard or reference by which others can be measured or judged", and index as "a number derived from a series of observations and used as an indicator or measure". Statistics textbooks more specifically define an "index number" as "a single figure that shows how a whole set of related variables has changed over time or differs from place to place". The present description uses benchmark in its more restricted sense to refer to a measure in the relatively restricted context of the present invention.

Portfolio/Fund Level Data

A critical element in the program of the present invention is publicly available portfolio data. There are at least two portfolio level fields of data (portfolio content and portfolio date) and two security level fields of data (CUSIPs or some other unique identifier and the number of shares for equities or par amounts for bonds). A CUSIP is a unique identifier. This data is generated from one or more of the following sources: Securities and Exchange Commission ("SEC") filings (these are referred to as "EDGAR filings") or the equivalent filings in other countries (i.e., in the case of those funds not registered in the United States). In the United States, all publicly traded funds are required to file at least semi-annual statements (i.e., one annual and one mid-year statement). Publicly traded funds issue annual, semi-annual and/or quarterly statements that provide a dated detailed list of securities comprising each portfolio/fund. Many mutual funds complexes, insurance companies, banks, etc. give detailed lists of the contents of their portfolios to various data providers. There are several data providers that compile security level data listings from both publicly and privately held portfolios/funds. Essentially these data providers use various combinations of the above sources to compile these listings.

Asset Class Data

Depending on the benchmark being constructed, certain fields are matched with portfolio data. For example, certain equity portfolio data will require a description of the security, sector code (possibly based on the Standard Industrial Classification (SIC) code), etc. A high yield corporate bond portfolio might additionally require coupon, maturity, call schedule, etc. This general set of data is designed to completely encompass the portfolio data and is referred to as the Asset Class Data. Depending on the asset class(es) the securities are drawn from, there are typically several firms that provide this type of data to those firms that manage the portfolios being benchmarked. Several brokerage firms (e.g., Merrill Lynch and Salomon/Smith Barney) as well as several firms unrelated to the brokerage and financial management industry provide this information (e.g., J. J. Kenny, which is owned by Standard and Poors, or EJV/Bridge).

Portfolio Tracking Data

Related to the Portfolio Data is the Portfolio Tracking Data. These values are used to aid in tracking those portfolios that are used to construct the benchmarks and used to determine expenses charged to shareholders. This data is currently available from the following two primary sources: (1) Lipper provides portfolio level data (e.g., Net Asset Values ("NAVs"), returns, distribution yields, management fees, total expenses, defined asset groupings, etc.) for all publicly traded open-end funds, closed-end funds, annuity/insurance products, etc. Of particular importance are the NAVs and financial performance data. (2) Morningstar provides portfolio level data (e.g., Morningstar 3 year, 5 year, and 10 year ratings, management fees, total expenses, as well as defined asset groupings), which in many cases closely mimic those of Lipper.

Mutual Fund Performance

Studies of current mutual fund performance suggest the following: (1) Investors chase returns, namely, the summation of dividend distributions and capital appreciation. (2) Some fund returns can be slightly predictable. That is, past winners tend to continue to win and past losers tend to continue to lose. (3) The persistence in these funds is due almost exclusively to momentum stocks. In other words any persistent fund performance is due to holding stocks, not trading them in and out, as one would expect an "active" manager to do. Therefore, the appearance of superior "active" management is due to a basic buy and hold strategy not active trading. (4) There appears to be less persistent skill in the mutual fund industry than one would expect. In short, the mutual fund industry's record often is not impressive. (5) Therefore, the costly professionals hired by mutual fund firms often are not warranted. See: "Cochrane, John H., New Facts in Finance", NBER Working Paper No. 7169, June 1999. P. 1–42.

SUMMARY OF THE INVENTION

A primary object of the present invention is to provide mutual fund systems, processes and products that are characterized essentially by a program which can be represented by pseudo-code defining the following steps: (a) selecting, from the universe of asset classes, a restricted number of asset classes that have demonstrated superior returns by maintaining momentum during an existing first period of time of relatively long duration; (b) selecting, from these asset classes, portfolios of assets that have demonstrated superior returns by maintaining momentum during an existing second period of time of relatively short duration; (c) establishing and optimizing a benchmark based upon these portfolios of assets to identify a moving portfolio having calculated momentum, and (d) tracking and periodically updating investment decisions to monitor and maintain the calculated momentum of the moving portfolio. Preferably, the first designated period of time is relatively extended, e.g. no less than two years, and the second designated period of time is relatively restricted, e.g., no more than two years. It is to be understood that each of the two periods of time extend backwardly from the same point of reference, one partially overlapping the other.

In the "normal" passive indexing approach, the benchmark/index is taken as a given (i.e., the benchmark is typically exogenous to the system). In some cases, a manager determines the benchmark/index. In the present case, indexing is not merely an outcome of endogenous forces. Rather, it is determined by exogenous forces (e.g., different portfolio managers, rating services, data availability, etc.) as well. The program herein takes one or more real snapshots of one or more real portfolios, and then establishes a benchmark accordingly.

BRIEF DESCRIPTION OF THE DRAWINGS

For a fuller understanding of the nature and objects of the present invention, reference is made to the following detailed specification, which is to be taken with the accompanying drawings, wherein:

FIGS. 2.1 to 2.2 are a composite listing of equity funds, ranked by estimated net inflows over a one year period, which constitute selections from an asset class that is identified in accordance with the illustrated example of the present invention;

FIGS. 3.1 to 3.5 are a composite listing of fixed income funds ranked by estimated net inflows over a one year period, which constitute another asset class from which selections alternatively could be made in accordance with an alternative example of the present invention;

FIGS. 4.1 to 4.2 illustrate a listing of the equity funds of FIGS. 2.1 to 2.2, ranked by estimated net inflows over a one-year period (calendar year 1999);

FIGS. 5.1 to 5.6 illustrate a Microsoft Excel spreadsheet for processing data in accordance with a step of the present invention;

FIGS. 6.1 to 6.6 illustrate another Microsoft Excel spreadsheet for processing data in accordance with a next step of the present invention;

FIGS. 7.1 to 7.8 illustrate a further Microsoft Excel spreadsheet for processing data in accordance with a next step of the present invention;

FIGS. 8.1 to 8.7 illustrate still another Microsoft Excel spreadsheet for processing data in accordance with a next step of the present invention; and FIGS. 9.1 to 9.5 illustrate another Microsoft Excel spreadsheet for processing data in accordance with a next step of the present invention.

DETAILED DESCRIPTION OF THE PREFERRED EMBODIMENT

General Description—FIG. 1

Figure 1:
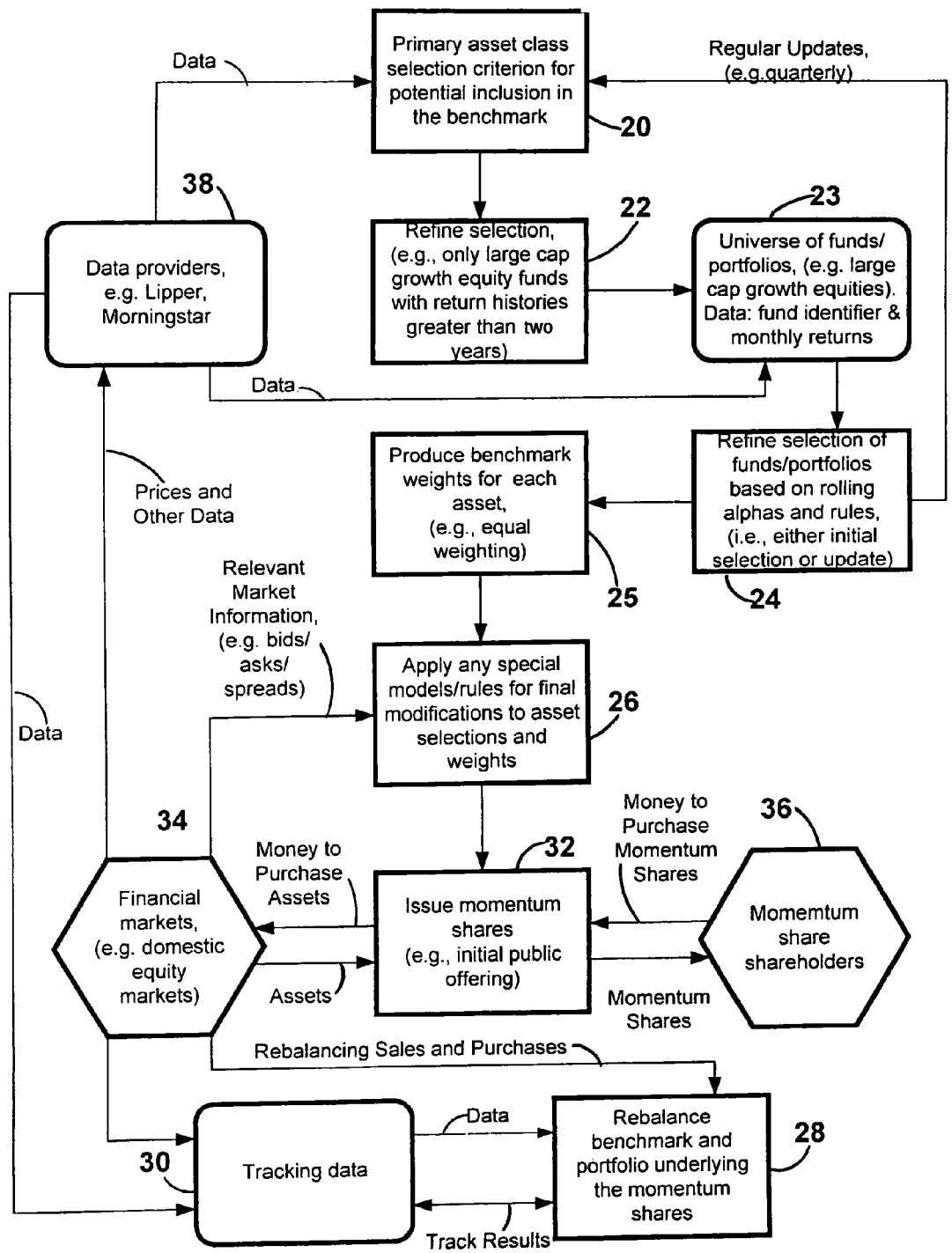
FIG. 1 is a flow diagram that generally illustrates the systems, processes and products of the present invention.

A flow diagram illustrating the system, process and product of the present invention is shown in FIG. 1 as including the following steps:

Step 1—as shown in blocks 20, 22, selecting, from the universe of asset classes, a restricted number of asset classes that have demonstrated superior returns by maintaining momentum during what may be defined as an existing first period of time of relatively long duration. (This first period extends backwardly from a specified reference point in time.) This selection identifies asset classes that are expected to outperform.

Step 2—as shown in blocks 23, 24, selecting, from the aforementioned restricted number of asset classes, portfolios of assets that have demonstrated superior returns by maintaining momentum during what may be defined as an existing second period of time of relatively short duration. (This second period extends backwardly from the specified reference point of time and partially overlaps the first period.)

Step 3—as shown in blocks 25, 26, establishing and optimizing (weighting and filtering) a benchmark based upon portfolios of assets 23, 24 to identify a moving portfolio having calculated momentum.

Step 4—as shown in blocks 28, 30, tracking and periodically updating investment decisions to monitor and maintain the calculated momentum of the moving portfolio.

Pursuant to Steps 1 through 4, above, issuing securities, purchasing portfolio assets and selling securities as shown in blocks 32, 34, 36.

In support of the calculations herein, the following is to be noted: (1) portfolio data (i.e., CUSIPs or some other unique identifier and share amounts) must be available for each portfolio meeting the criteria of Steps 1 through 4; and (2) any fund/portfolio should have some unique identifier (e.g., a five character Nasdaq® symbol—National Association of Securities Dealers Automated Quotation System). The aforementioned unique identifiers are needed for confirming the identity of the fund/portfolios in order to process the various sets of data in a computer.

There now follow detailed descriptions of the steps of the present invention.

Step 1—Identify Asset Classes that are Expected to Outperform FIG. 1—Blocks 20,22; FIGS. 2.1–2.2, 3.1–3.5, 4.1–4.2

FIGS. 2.1 to 2.2 are an example of a composite listing of equity funds, ranked by estimated net inflow over a one year period. Essentially, the most promising asset class will be that which has had the greatest net flows over the last year or more.

FIGS. 3.1 to 3.5 are another example, in the form of a composite listing of fixed income funds, which constitute other asset classes from which selections alternatively could be made in accordance with another example of the present invention.

As of January, 2000, large cap growth equity funds have had the largest Total Net Assets ("TNA"), offer the largest 10 year Estimated Net Flows ("ENF"), and offer the largest one year Estimated Net Flows. Therefore, as of January 2000, large cap growth equity funds constitute a preferred universe from which the listing illustrated herein is selected.

FIGS. 4.1 to 4.2 illustrate a listing of the equity asset groupings of FIGS. 2.1 to 2.2, ranked by estimated net flows over the calendar year 1999. Given that this case is for illustration purposes, it should be noted that the one year period is for illustration purposes and could conceivably be significantly extended in practice.

Step 2—Identify the Funds/Portfolios that are Expected to Outperform FIG. 1—Blocks 23,24

This step consists essentially of the following sub-steps:

Step 2.1 Perform regression analysis on all funds/portfolios in the selected asset class(es) in order to select those funds expected to outperform in the future. In this example, we take an equally weighted group of the 4 top funds/portfolios in the large-cap growth group.

Step 2.2 Update this analysis periodically, in this example once every three months, i.e., once a quarter. Drop and add funds based on this analysis. In this example, we apply an arbitrary rule based on a quarterly turnover of at most one fund/portfolio. Therefore, we drop the weakest of the four previous funds/portfolios and add the strongest fund/portfolio not included in the four funds/portfolios comprising the benchmark. Thus, we target a 100% turnover per year. However, it is to be understood that there may be no turnover in any one or more quarters when all four top funds stay within the evaluation criteria.

Step 2.3 As funds/portfolios are dropped and others added in their place, rebalancing will occur in order to maintain tracking with respect to the benchmark.

The regression methodology used in this example is largely based on the following financial economists:

Jensen (e.g., see Jensen, M., "The Performance of Mutual Funds in the Period 1945–1964," The Journal of Finance, Vol. XXIII, No. 2, May 1968, 389–419);

Hendricks, D., Patel, J., and R. Zeckhauser, "Hot Hands in Mutual Funds: Short-Run Persistence of Relative Performance, 1974–1988," The Journal of Finance, March 1993, 93–130;

Grinblatt, M., and S. Titman, "Portfolio Performance Evaluation: Old Issues and New Insights," The Review of Financial Studies, Vol. 2, No. 3, 1989, 393–421;

Grinblatt, M., and S. Titman, "Mutual Fund Performance: An Analysis of Quarterly Portfolio Holdings," Journal of Business, Vol. 62, No. 3, 1989, 393–416;

Grinblatt, M., and S. Titman, "The Persistence of Mutual Fund Performance," The Journal of Finance, Vol. XLVII, No. 5, December 1992, 1977–1984;

Grinblatt, M., and S. Titman, "Performance Measurement without Benchmarks: An Examination of Mutual Fund Returns," Journal of Business, Vol. 66, No. 1, 1993, 47–68;

Grinblatt, M., Titman, S., and R. Wermers, "Momentum Investment Strategies, Portfolio Performance, and Herding: A Study of Mutual Fund Behavior," The American Economic Review, Vol. 85, No. 5, December 1995, 1088–1105, etc.

The basic regression used here (and in most of the studies searching for mutual fund return persistence) is done to calculate some version of "Jensen's alpha". In this example, the following will be the form of the calculation (i.e., this is very standard): the "Jensen Measure is the intercept in a regression of the time series of excess returns (above the one month Treasury Bill rate) of the evaluated portfolio against the time series of excess returns of the benchmark portfolio(s). This is the traditional measure used in most previous studies of fund performance." Grinblatt, M., and S. Titman, "A Study of Monthly Mutual Fund Returns and Performance Evaluation Techniques," Journal of Financial and Quantitative Analysis, Vol. 29, No. 3: September 1994, p. 423.

This regression calculation is as follows:

$$RMF_t^i - RTB_t = \alpha^i + \beta^i(RAC_t - RTB_t) + e_t^i$$

where $RMF_t^i$

=return for mutual fund i at time t (i.e., month t), $RTB_t$

=return for Treasury Bill at time t, $\alpha^i$

=alpha of mutual fund i, $\beta^i$

=beta (i.e., slope coefficient) for mutual fund i, $RAC_t$

=return for mutual fund asset class at time t, and $e_t^i$

=error term for mutual fund i at time t. Therefore, the estimated equation is of the form:

$$\hat{\alpha}^i = (RMF^i - RTB) - [\hat{\beta}^i(RAC - RTB)],$$

where alpha and beta are estimates.

Effectively, we are focusing on calculating rolling alphas for each fund in the large-cap growth asset class designation using 24 month intervals. Generally, we are dropping at least one data point and adding at least another every month (hence the reference to rolling regressions). The practical goal is to identify those individual funds with the best recent risk-adjusted performance (i.e., over the last two years) under the assumption that some of that relative performance (i.e., relative to other funds in its asset class) will persist into the near future. The literature in this field suggests that two years is a good period of time to use (i.e., three or more may be too long), and that some version of Jensen's alpha is useful in identifying future performers (especially for certain asset classes like growth equities).

Step 3—Establish and Optimize (Weight and Filter) FIG. 1—Blocks 25, 26

This step involves consolidating the investments contained by the selection of Step 2 to provide a composite list of current investments; filtering the composite list to provide a preliminary moving portfolio of investments; and filtering the preliminary moving portfolio of investments to provide an enhanced moving portfolio of investments.

Each of the securities in the selection of current portfolios has a unique CUSIP identifier. For each of the securities, the CUSIP and the shares data are combined with pricing data. For each of the current portfolios the estimated total market value is calculated as follows:

(1) For each of the securities in the selected portfolio/funds, combine the CUSIP and shares data with pricing data in order to calculate market value weightings. In addition to price, add other fields such as CUSIP, transaction costs, liquidity, description, and industry sector. In short, combine the portfolio data with the asset class data for that specific benchmark. Also, for each portfolio/fund, consolidate any securities with duplicate identifiers (i.e. CUSIPS) by summing up the market value for that identifier.

(2) For each portfolio/fund in the benchmark, calculate the estimated total market value for that portfolio as follows:

$$PMV = \sum_{i=1}^{N} Shares_i * Price_i,$$

where N=the number of securities in that portfolio/fund, and PMV=the portfolio/fund market value;

(3) Sum up all the PMVs (i.e., $$TBMV = \sum_{j=1}^{J} PMV^j,$$

where J=the number of portfolios/funds in the benchmark (in this case 4), and TBMV=total benchmark market value);

(4) Create a scaling factor in order to equally weight the portfolios by taking the reciprocal of the weight of each portfolio as follows:

$$SF^j = 1/(PMV^j/TBMV),$$

where
$SF^j$
=the scaling factor for the jth portfolio/fund.

(5) adjust the scaling factor so that the sum of the scaling factors equal unity, $$ASF^j = SF^j \bigg/ \sum_{j=1}^{J} SF^j,$$

where
=the adjusted scaling factor for the jth portfolio/fund, and
$ASF^j$ (6) Adjust the securities in the benchmark so that each portfolio/fund receives an equal weight (as opposed to each security) by multiplying each security in each portfolio/fund by its appropriate adjusted scaling factor, $$AMV_i^j = MV_i^j * ASF^j,$$

where
$AMV_i^j$
=the adjusted market value of security i in portfolio/fund j; and (7) Based on step 6, create an adjusted weight for each security in each portfolio/fund in the benchmark, $$x_i^j = AMV_i^j \bigg/ \left( \sum^{j} \sum_{i=1}^{N} AMV_i^j * J \right),$$

where
$x_i^j$
=the weight of the ith security in the jth portfolio/fund, and $$\sum^{j} \sum_{i=1}^{N} x_i^j = 1/J$$

(by construction).

The final filters include the following: (a) each security must be listed on a major domestic or overseas stock quotation system; (b) each security must have been traded for at least 1 year; (c) each security must have an annualized share turnover rate exceeding 20% of the common shares outstanding; (d) over 50% of the total common shares of a company's stock must not be owned by insiders; (e) transaction costs are minimized, subject to movement with the underlying theoretical benchmark.

The arrangement is such that filter (a) requires that the securities be traded on a large recognized stock exchange; filter (b) establishes some base minimum seasoning for shares; filter (c) establishes some base level of demonstrated liquidity over the last year; filter (d) merely diminishes the odds that the shares of any company held in the portfolio are unduly influenced by insiders, and works as an extra liquidity filter; and filter (e) is an explicit attempt to enhance the returns of the portfolio by minimizing transaction costs subject to the constraint of requiring that the resulting portfolio reflect the original portfolio's financial characteristics.

The following is the formulation for the optimization used in filter (e):

$$TC = \sum_{i=1}^{N} TC_i * x_i,$$

Minimize where TC transaction costs (these are based on bid/ask spreads). In a typical portfolio/fund example, N=519 (i.e., 566 minus the 47 dropped in the first 4 filters).

$$\beta^{US} \leq 1.01$$

$$\beta^{US} \geq 0.99$$

Subject to, where
$\beta^{US}$
=the beta of the portfolio/fund example. Also, by definition $$\sum_{i}^{N} \beta_i * x_i = 1 = \beta$$

where N=519 and β=the beta of the portfolio before the optimization (i.e., the sensitivity of the portfolio/fund to movements in the benchmark). Therefore, by definition, β=1.

βs are estimated for each of the securities in any selection by the following regression analysis:

$$R_{it} = \alpha_i + \beta_i * R_i^{US} + e_{it},$$

where R=return, i denotes for security i of the number of securities in said selection, t denotes day t of one year of daily values, and α=alpha of the regression, both α and β being estimated by regressing approximately 200 daily returns for the security against the market weighted returns for the portfolio/fund of said selection of securities.

Step 4—Tracking and Periodically Updating FIG. 1—Blocks 28, 30

The moving portfolio is repetitively updated in accordance with Steps 1, 2 and 3.

EXAMPLE

A specific example, illustrating the system, process and product of the present invention, is given below in reference to the Microsoft Excel spreadsheets depicted in FIGS. 5.1–5.6, 6.1–6.6, 7.1–7.8, 8.1–8.7 and 9.1–9.6. These spreadsheets perform calculations, which generate a running list of funds that are included in a benchmark for a large-cap growth equity momentum shares portfolio during a time span that includes the period from Jan. 31, 1997 to Mar. 31, 2000.

The Spreadsheet of FIGS. 5.1–5.6

This is the "rawdata" spreadsheet, i.e., returns, expenses, and fund identifiers. There are no calculations and/or filtering at this stage. This spreadsheet draws data from Lipper with some fund identifier and monthly total returns for each fund in the large-cap growth equity group going back to Jan. 31, 1995 (i.e., through Mar. 31, 2000). In addition, it matches this file with 1 month Treasury Bill return data from the Federal Reserve Board's H. 15 release. (There are many other potential sources.)

The Spreadsheet of FIGS. 6.1–6.6

Next comes the filtering to reduce the sample to the set from which final selections are made. In addition, an average monthly return is calculated across the 122 funds that survived the filters. This spreadsheet filters the fund level data as follows: (1) cuts the period from Dec. 31, 1989 through Mar. 31, 2000 to Jan. 31, 1995 through Mar. 31, 2000; (2) eliminates all funds without full return data during the period Jan. 31, 1995 through Mar. 31, 2000; and (3) eliminates all duplicate fund data while keeping those funds with the lowest stated total expenses.

The Spreadsheet of FIGS. 7.1–7.8

This spreadsheet nets out the "risk-free rate" from individual and average fund returns. It calculates returns net of "risk-free rate". Of the original funds, 122 remain after applying the initial filters mentioned. Therefore, the universe of funds is this list of 122 large-cap growth equity funds. This netting of the "risk-free rate" also is applied to the average return for the 122 funds. Reference is made to the above regression equations to explain the processing of both the individual funds monthly returns and their average or median monthly returns.

The Spreadsheet of FIG. 8.1–FIG. 8.7

This spreadsheet calculates the rolling alphas, which are the basis for fund inclusion/exclusion in the benchmark. It calculates rolling 2 year (i.e., 24 month) alphas over the period Dec. 31, 1996 through Mar. 31, 2000. This is done for all 122 funds. These alphas form the basis by which funds are included and/or dropped from the benchmark every time the benchmark is updated (in this case quarterly).

The Spreadsheet of FIGS. 9.1–9.5

This spreadsheet tracks the funds comprising the benchmark. Essentially, it summarizes the combination of the alphas derived in the previous spreadsheet and the rules of fund selection discussed in the first part of this document. Funds must be large-cap growth equity funds as defined by Lipper. The benchmark comprises four of these funds. Each calendar quarter one or none of these funds will be dropped and replaced by that fund with the best-estimated alpha (i.e., outside of the top three current funds included in the benchmark). This spreadsheet displays the rolling selected funds (in this example 4 funds are always maintained in the benchmark—equally weighted) as they would appear chronologically to implement the strategy of the present invention. For example, given the lag involved with the data, the data for Jan. 31, 1997 is based on the known Dec. 31, 1996 data.

Rebalancing the Benchmark

Rebalancing involves repeating the foregoing steps periodically. In this example, after the initial four funds are selected, typically only one will need to be changed each quarter. Although, as can be seen from the $2^{nd}$ and $3^{rd}$ to last quarterly updates in this example, there is no change required because the same four are still rated in the top four by this method.

Operation

The operation of the present mutual fund systems, processes and products involves: selecting a restricted number of asset classes/groups that have demonstrated superior returns by maintaining momentum during an existing first period of time of relatively long duration; selecting portfolios of assets that have demonstrated superior returns by maintaining momentum during an existing second period of time of relatively short duration; establishing and optimizing a benchmark based upon these portfolios of assets to identify a moving portfolio having calculated momentum, and tracking and periodically updating investment decisions to monitor and maintain the calculated momentum of the moving portfolio. The practical value of the aforementioned systems, processes and products is demonstrated by the following. The aforementioned spreadsheet example added about 14% incremental risk-adjusted return per year. The geometric average annual return for this example was 47.30% per year (over the 39 month period analyzed—Jan. 31, 1997 through Mar. 31, 2000) versus 33.45% for the average fund (i.e., for the 122 fund universe). The aforementioned example focuses on large-cap growth equities. But this approach is applicable within and across many other asset classes/groups.

What is claimed is:

1. A financial system comprising:
(a) electronic means for selecting, from a universe of first asset classes, a first portfolio containing a restricted number of said first asset classes that have demonstrated superior returns by maintaining momentum during a first period of time of relatively long duration;
(b) electronic means for selecting, from said first portfolio, a second portfolio of selected assets that have demonstrated superior returns by maintaining momentum during a second period of time of relatively short duration;
(c) electronic means for establishing and optimizing a benchmark based upon said first portfolio and said second portfolio to identify a moving portfolio having a calculated momentum index, and
(d) electronic means for tracking and periodically updating investment decisions to monitor and maintain said momentum index said moving portfolio.

2. The financial system of claim 1 wherein said first period of time is at least two years and said second period of time is at most two years.

3. A financial process comprising the steps of:
(a) electronic selecting, from a universe of asset classes, a first portfolio containing a restricted number of asset classes that have demonstrated superior returns by maintaining momentum during a first period of time of relatively long duration;
(b) electronic selecting, from said first portfolio, a second portfolio of assets that have demonstrated superior returns by maintaining momentum during a second period of time of relatively short duration;
(c) electronic establishing and optimizing a benchmark based upon said first portfolio and said second portfolio to identify a moving portfolio having a calculated momentum benchmark, and
(d) electronic tracking and periodically updating investment decisions to monitor and maintain said calculated momentum benchmark of said moving portfolio.

4. The financial process of claim 3 wherein said first period of time is at least two years and said second period of time is at most two years.

5. A financial system comprising:
(a) electronic means for selecting, from a universe of asset classes, a first portfolio containing a restricted number of asset classes that have demonstrated superior asset flows by maintaining momentum during an existing first period of time of relatively long duration;
(b) electronic means for selecting, from said first portfolio, a second portfolio of selected assets that have demonstrated superior returns by maintaining momentum during an existing second period of time of relatively short duration;
(c) electronic means for establishing and optimizing a benchmark based upon said first portfolio and said second portfolio to identify a moving portfolio having a calculated momentum benchmark, and
(d) electronic means for tracking and periodically updating investment decisions to monitor and maintain calculated momentum benchmark;
(e) said second mentioned means for selecting operating in accordance with the following regression:

$$RMF_t^i - RTB_t = \alpha^i + \beta^i(RAC_t - RTB_t) + e_t^i$$

where
$RMF_t^i$
=return for portfolio or mutual fund i at time t (i.e., month t),
$RTB_t$
=turn for specified asset at time t,
$\alpha^i$
=alpha of mutual fund i,
$\beta^i$
=beta (i.e., slope coefficient) for mutual find i,
$RAC_t$
=return for mutual fund asset class at time t, and
$e_t^i$
=error term for mutual fund i at time t. Therefore, the estimated equation is of the form:

$$\hat{\alpha}^i = (RMF^i - RTB) - [(\hat{\beta}^i(RAC - RTB)]$$

where alpha and beta are estimates.

6. The financial system of claim 5 wherein said first period of time is at least two years and said second period of time is at most two years.

7. A financial process comprising the steps of:
(a) first, electronically selecting, from a universe of asset classes, a first group containing a restricted number of asset classes that have demonstrated superior returns and/or asset flows by maintaining momentum during an existing first period of time of relatively long duration;
(b) second, electronically selecting, from said first set, a second set of assets that have demonstrated superior returns by maintaining momentum during an existing second period of time of relatively short duration;
(c) third, electronically establishing and optimizing a benchmark based upon said first set and said second set to identify a moving portfolio having a calculated momentum benchmark, and
(d) fourth, electronically tracking and periodically updating investment decisions to monitor and maintain said calculated momentum benchmark.
(e) said second step of selecting being performed in accordance with the following regression:

$$RMF_t^i - RTB_t = \alpha^i + \beta^i(RAC_t - RTB_t) + e_t^i,$$

where
$RMF_t^i$
=return for mutual fund i at time t (i.e., month t),
$RTB_t$
=return for Treasury Bill at time t,
$\alpha^i$ =alpha of mutual fund i,
$\beta^i$
=beta (i.e., slope coefficient) for mutual find i,
$RAC_t$
=return for mutual find asset class at time t, and
$e_t^i$
=error term for mutual fund i at time t
the estimated equation being of the form:

$$\hat{\alpha}^i = (RMF^i - RTB) - [\hat{\beta}^i(RAC - RTB)]$$

where alpha and beta are estimates.

8. The financial process of claim 7 wherein said first period of time is at least two years and said second period of time is at most two years.

9. A financial system comprising:
(a) electronic means for selecting, from a universe of asset classes, a restricted number of asset classes that have demonstrated superior returns and/or asset flows by maintaining momentum during an existing first period of time of relatively long duration;
(b) electronic means for selecting, from these asset classes, portfolios of assets that have demonstrated superior returns by maintaining momentum during an existing second period of time of relatively short duration;
(c) electronic means for establishing and optimizing a benchmark based upon these portfolios of assets to identify a moving portfolio having calculated momentum, and
(d) electronic means for tracking and periodically updating investment decisions to monitor and maintain the calculated momentum of the moving portfolio.
(e) said second mentioned means for selecting operating in accordance with the following regression:

$$RMF_t^i - RTB_t = \alpha^i + \beta^i(RAC_t - RTB_t) + e_t^i,$$

where
$RMF_t^i$
=return for mutual fund i at time t (i.e., month t),
$RTB_t$
=return for specified asset at time t,
$\alpha^i$
=alpha of mutual find i
$\beta^i$
=beta (i.e., slope coefficient) for mutual fund i,
$RAC_t$
=return for mutual fund asset class at time t, and
$e_t^i$
=error term for mutual find i at time t, the estimated equation being in the form:

$$\hat{\alpha}^i = (RMF^i - RTB) - [\hat{\beta}^i(RAC - RTB)],$$

where alpha and beta are estimates.

10. The financial system of claim 9 wherein said first period of time is at least two years and said second period of time is at most two years.

11. A financial process comprising the steps of:
(a) electronically selecting, from a universe of asset classes, a restricted number of asset classes that have demonstrated superior returns and/or asset flows by maintaining momentum during an existing first period of time of relatively long duration;
(b) electronically selecting, from these asset classes, portfolios of assets that have demonstrated superior returns by maintaining momentum during an existing second period of time of relatively short duration;
(c) electronically establishing and optimizing a benchmark based upon these portfolios of assets to identify a moving portfolio having calculated momentum, and
(d) electronically tracking and periodically updating investment decisions to monitor and maintain the calculated momentum of the moving portfolio.
(e) said second mentioned selecting operating in accordance with the following regression:

$$RMF_t^i - RTB_t = \alpha^i + \beta^i(RAC_t - RTB_t) + e_t^i,$$

where
$RMF_t^i$
=return for mutual fund i at time t (i.e., month t),
$RTB_t$
=return for specified asset at time t,
$\alpha^i$
=alpha of mutual find i
$\beta^i$
=beta (i.e., slope coefficient) for mutual fund i,
$RAC_t$
=return for mutual fund asset class at time t, and
$e_t^i$
=error term for mutual find i at time t, the estimated equation being in the form:

$$\hat{\alpha}^i = (RMF^i - RTB) - [\hat{\beta}^i(RAC - RTB)],$$

where alpha and beta are estimates.

12. The financial process of claim 11 wherein said first period of time is at least two years and said second period of time is at most two years.

* * * * *